(12) United States Patent
Mirth et al.

(10) Patent No.: US 9,095,209 B2
(45) Date of Patent: Aug. 4, 2015

(54) ARTICLE OF FURNITURE WITH CHANNEL ADAPTED TO HOLD A DEVICE AND INTERLOCKING CONSTRUCTION

(71) Applicants: Daniel Joseph Mirth, University City, MO (US); Sarah Elizabeth Carpenter, St. Louis, MO (US)

(72) Inventors: Daniel Joseph Mirth, University City, MO (US); Sarah Elizabeth Carpenter, St. Louis, MO (US)

(73) Assignee: Artifox LLC, St. Louis, MO (US)

( * ) Notice: Subject to any disclaimer, the term of this patent is extended or adjusted under 35 U.S.C. 154(b) by 0 days.

(21) Appl. No.: 14/134,920

(22) Filed: Dec. 19, 2013

(65) Prior Publication Data

US 2015/0173505 A1 Jun. 25, 2015

(51) Int. Cl.
*A47B 13/00* (2006.01)
*A47B 13/16* (2006.01)
*A47B 47/00* (2006.01)

(52) U.S. Cl.
CPC .............. *A47B 13/16* (2013.01); *A47B 13/003* (2013.01); *A47B 47/00* (2013.01)

(58) Field of Classification Search
USPC ........ 312/257.1, 258, 259, 223.3, 195, 223.6, 312/223.1; 108/157.14, 158.12, 157.18, 108/153.1, 50.01, 50.02, 25, 26, 50.18
See application file for complete search history.

(56) References Cited

U.S. PATENT DOCUMENTS

| | | | | |
|---|---|---|---|---|
| 1,940,117 A | * | 12/1933 | Carpos | 108/157.18 |
| 2,686,096 A | * | 8/1954 | Barnes, Jr. | 108/158.12 |
| 3,069,216 A | * | 12/1962 | Vaeth | 312/195 |
| 3,566,816 A | | 3/1971 | Zilg et al. | |
| 4,323,291 A | * | 4/1982 | Ball | 312/194 |
| 4,363,587 A | | 12/1982 | Rooklyn | |
| 4,648,574 A | | 3/1987 | Granlund | |
| 4,765,253 A | * | 8/1988 | Schappach | 108/158.12 |
| 5,231,562 A | * | 7/1993 | Pierce et al. | 108/50.02 |
| 5,577,450 A | | 11/1996 | Huang | |
| 5,640,912 A | * | 6/1997 | Diffrient | 108/50.02 |
| 5,803,548 A | | 9/1998 | Battle | |
| 5,931,103 A | | 8/1999 | Huang | |
| 5,974,985 A | * | 11/1999 | Flototto et al. | 108/157.18 |
| 6,279,489 B1 | | 8/2001 | Daniel | |
| 6,619,601 B1 | * | 9/2003 | Vall | 108/158.12 |
| 6,619,749 B2 | | 9/2003 | Willy | |
| 6,631,957 B2 | | 10/2003 | Leong | |
| 6,647,900 B1 | * | 11/2003 | Kopish | 108/50.02 |

(Continued)

OTHER PUBLICATIONS

Spell, Embrace interaction platform datasheet, 2 pages Dec. 5, 2013.

(Continued)

*Primary Examiner* — Jose V Chen
(74) *Attorney, Agent, or Firm* — Bryan Cave LLP

(57) ABSTRACT

An article of furniture, comprising a top panel having a bottom surface and a top surface, and at least one channel disposed in the top panel. The channel comprises top and bottom openings which are connected such that the channel forms a passageway from the top surface to the bottom surface of the top panel wherein the bottom opening is behind the top opening. Additionally, an article of furniture may comprise a first support member, a second support member, and one or more cross member assemblies. The one or more cross member assemblies comprise a shelf member, a first rail and a second rail, wherein the first rail and the second rail are rotatably connected to the shelf member such that the first and second rails are adapted to be in a first position for shipping and are adapted to be rotated to a second position for assembly.

22 Claims, 23 Drawing Sheets

(56) References Cited

U.S. PATENT DOCUMENTS

| | | | |
|---|---|---|---|
| 6,659,022 B1* | 12/2003 | Holtz | 108/158.12 |
| 6,675,979 B2* | 1/2004 | Taylor | 108/158.12 |
| 6,742,461 B1 | 6/2004 | Sen | |
| 7,490,643 B2 | 2/2009 | Liu et al. | |
| 7,536,960 B1* | 5/2009 | Perez et al. | 108/43 |
| 8,079,315 B2* | 12/2011 | Berent et al. | 108/158.12 |
| 8,220,399 B2 | 7/2012 | Berent et al. | |
| 8,667,904 B2* | 3/2014 | Pajic | 108/43 |
| 8,826,830 B2* | 9/2014 | Pajic | 108/50.01 |
| 2002/0069797 A1* | 6/2002 | Case, Jr. | 108/157.18 |
| 2003/0217673 A1* | 11/2003 | Berger et al. | 108/44 |
| 2004/0261668 A1* | 12/2004 | Jarke et al. | 108/43 |
| 2010/0024688 A1* | 2/2010 | Kitada et al. | 108/50.02 |
| 2010/0093257 A1* | 4/2010 | Elliott | 108/158.12 |
| 2010/0171398 A1* | 7/2010 | Berthiaume et al. | 312/195 |
| 2010/0236452 A1* | 9/2010 | Ruddy | 108/43 |
| 2010/0242808 A1 | 9/2010 | Negoro et al. | |
| 2011/0239912 A1 | 10/2011 | Palese | |
| 2012/0160136 A1* | 6/2012 | Lineal et al. | 108/43 |
| 2013/0019453 A1 | 1/2013 | Berent et al. | |
| 2013/0025506 A1 | 1/2013 | Brennan | |
| 2013/0068141 A1 | 3/2013 | Hsiao | |
| 2013/0147716 A1* | 6/2013 | Hawker et al. | 108/43 |

OTHER PUBLICATIONS

Spell, Nomad tablet table datasheet, 2 pages Dec. 5, 2013.
Spell, Nomad tablet docksystems datasheet, 1 page Dec. 5, 2013.
Spell, Nomad nightstand datasheet, 2 pages Dec. 5, 2013.
Spell, Nomad tablet tables flyer, 2 pages Dec. 5, 2013.

* cited by examiner

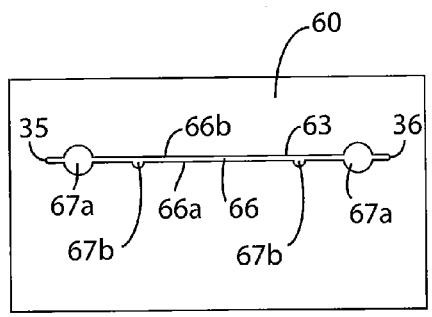
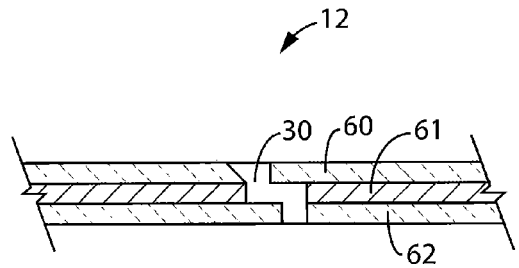
FIG. 4
FIG. 4A

ARTICLE OF FURNITURE WITH CHANNEL ADAPTED TO HOLD A DEVICE AND INTERLOCKING CONSTRUCTION

FIELD OF THE INVENTION

This invention relates generally to articles of furniture and, more particularly, to an article of furniture that has a top panel with a channel for holding a device and an article of furniture that can be assembled without requiring additional tools or fasteners.

BACKGROUND

With the advent of many portable electronic devices such as smartphones, tablets and mp3 players there has arisen a need to easily and conveniently mount, charge and/or display such portable electronic devices at a user's arm's reach and in view on an article of furniture such as a desk. Currently, docks and/or charging stations are required to be located on the article of furniture in order to mount, charge and/or display such portable electronic devices. However, such docks are typically proprietary to the brand and/or model of portable electronic device such that a user will require multiple docks if he or she wishes to have multiple portable electronic devices on his or her desk. These docks and associated wires can clutter the desk. Additionally, many current articles of furniture are bulky when shipped and purchased and may require additional tools and fasteners to assemble. Many types of "flat pack" or "ready to assemble" furniture have reduced bulk for shipping and can be assembled with few tools, however, such articles of furniture may is not easily disassembled and/or reassembled.

Accordingly, there is a constant need in the art to make an article of furniture having a channel into which many different types and sizes of portable electronic devices can be inserted so that the portable electronic devices can be easily and conveniently mounted, charged and/or displayed at a user's arm's reach and in view on an article of furniture.

Additionally, there is a need in the art for an article of furniture which can be flat packed and can be assembled, disassembled and reassembled without any tools.

SUMMARY OF THE INVENTION

Briefly, therefore, one embodiment of the invention is directed to an article of furniture, comprising a top panel having a bottom surface and a top surface, and at least one channel disposed in the top panel. The channel comprises a top opening and a bottom opening which are connected such that the channel forms a passageway from the top surface to the bottom surface of the top panel wherein the bottom opening is disposed behind top opening. The channel is adapted to receive a device in the top opening.

Another embodiment of the invention is directed to an article of furniture comprising a first support member, a second support member, and one or more cross member assemblies. The one or more cross member assemblies comprise a shelf member, a first rail and a second rail, wherein the first rail and the second rail are rotatably connected to the shelf member such that the first and second rails are adapted to be in a first position and are adapted to be rotated to a second position. The first rail comprises a population of notches adapted to be interlocked with one or more of the first support member and the second support member when the first rail is in the second position and the second rail comprises a population of notches adapted to be interlocked with one or more of the first support member and the second support member when the second rail is in the second position.

Yet another embodiment of the invention is directed to an article of furniture comprising a top panel a left leg member, a right leg member, and a cross member assembly. The top panel comprises a left-hand portion, a right-hand portion, a bottom surface, a top surface, and a population of slots disposed on the bottom surface. The left leg member comprises a top portion, one or more legs extending a direction from the top portion, a population of tabs extending from the top portion opposite the direction of the one or more legs, and a population of notches disposed in the top portion. The population of tabs of the left leg member are adapted to be inserted into one or more of the population of slots of the top panel. The right leg member comprises a top portion, one or more legs extending a direction from the top portion, a population of tabs extending from the top portion opposite the direction of the one or more legs, and a population of notches disposed in the top portion. The population of tabs of the right leg member are adapted to be inserted into one or more of the population slots of the top panel. The cross member assembly has a first rail, a second rail, and a shelf member. The first rail has a population of tabs adapted to be inserted into one or more of the population of slots of the top panel and a population of notches adapted to interlock with one or more of the population of notches of one or more of the left leg member and the right leg member. The second rail has a population of tabs adapted to be inserted into one or more of the population of slots of the top panel and a population of notches adapted to interlock with one or more of the population of notches of one or more of the left leg member and the right leg member. The shelf member is rotatably affixed to the first rail and the second rail is rotatably affixed to the shelf member.

BRIEF DESCRIPTION OF THE FIGURES

These and other features, aspects and advantages of the invention will become more fully apparent from the following detailed description, appended claims, and accompanying drawings, wherein the drawings illustrate features in accordance with exemplary embodiments of the invention, and wherein:

FIG. 4 is a top view of multiple panels forming a top panel of an article of furniture according to one embodiment of the invention;

FIG. 4A is a right cross section view of multiple panels forming a top panel of an article of furniture according to one embodiment of the invention;

DETAILED DESCRIPTION

Before any embodiments of the invention are explained in detail, it will be understood that the invention is not limited in its application to the details of construction and the arrangement of components set forth in the following description or illustrated in the following drawings. The invention is capable of other embodiments and of being practiced or of being carried out in various ways. Also, it will be understood that the phraseology and terminology used herein is for the purpose of description and should is not regarded as limiting. The use of "including," "comprising," or "having" and variations thereof herein is meant to encompass the items listed thereafter and equivalents thereof as well as additional items.

Figure 1:
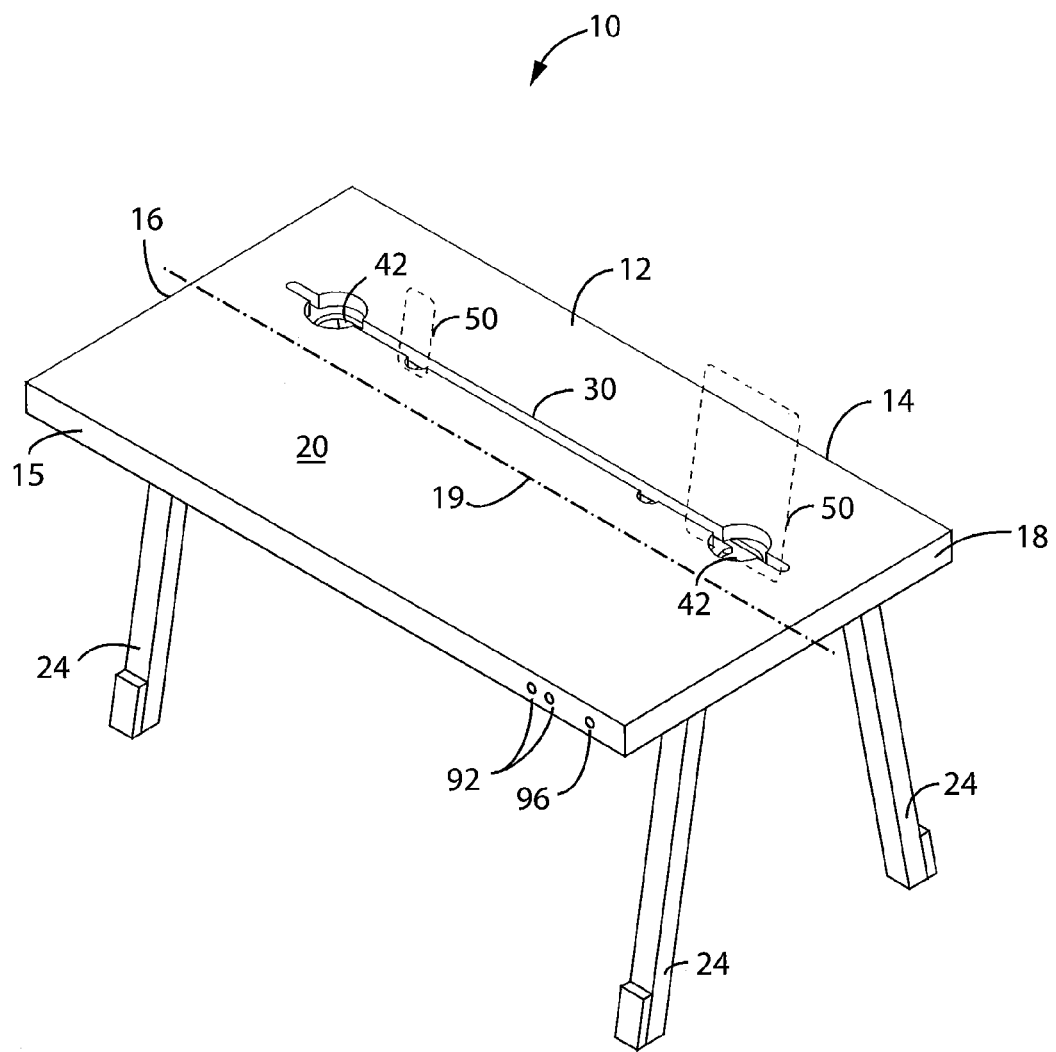
FIG. 1 is a right front perspective view of an article of furniture according to one embodiment of the invention.
Figure 1A:
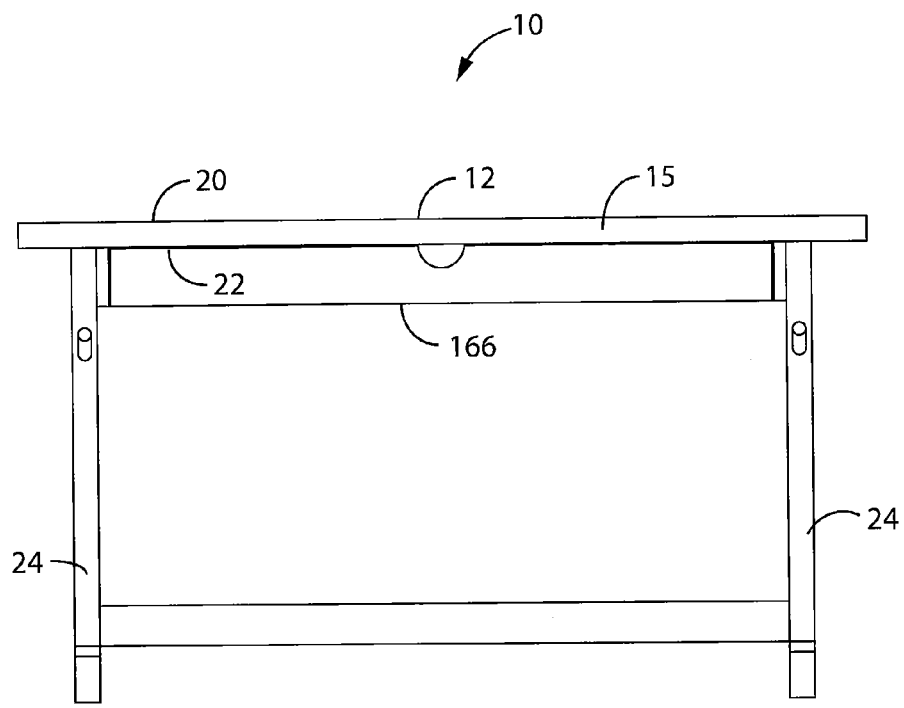
FIG. 1A is a front view of an article of furniture according to one embodiment of the invention.

FIG. 1 illustrates an article of furniture 10 according to one embodiment of the invention. Article of furniture 10 includes a top panel 12 having a back portion 14, a front portion 15, a left-hand portion 16, a right-hand portion 18, and a major axis 19. Article of furniture 10 may include, but is not limited to, a desk, table, nightstand, coffee table, bookshelf, conference table, side table, buffet table, media console, etc. Top panel 12 also has a top surface 20, a bottom surface 22 (see FIG. 2A) and a thickness between the top surface 20 and the bottom surface 22. In certain embodiments, top panel 12 may be rectangular; however, in other embodiments, top panel 12 may be any shape including, but not limited to, square, round, elliptical, ovular, hexagonal, etc. without departing from the scope of the invention.

Top panel 12 may be supported by one or more support members 24. In various embodiments, support members 24 may be one or more legs. However, it will be understood that in various embodiments, support members 24 may comprise any type of support structure known in the art for supporting a top panel 12 without departing from the scope of the invention. Additionally, in various embodiments, for example, top panel 12 may be affixed to a variety of items, including, but not limited to, a wall, a door, a window, another article of furniture, etc.

Top panel 12 further includes a channel 30 which is adapted to hold a device 50 and/or a wire or cord 52. Device 50 may include any type of device. For example, device 50 may include, but is not limited to, a telephone such as a smartphone, a tablet computer, a portable music player (e.g., an mp3 player), a portable gaming device, a GPS device, a digital picture frame, an e-reader, and/or any type of portable electronic device. Device 50, may also include, but is not limited to, a chalkboard, a dry erase board, a notepad, and/or some other device adapted to be written on. Device 50, may further include, but is not limited to, a picture frame, a book, a magazine, a newspaper, a clipboard, a wire or cord 52, etc.

Referring now to FIGS. 2, 2A, 2B, and 2C, an embodiment of channel 30 in top panel 12 is described in detail. Channel 30 may be disposed in top panel 12. Channel 30 may extend a length from left terminal end 35 to right terminal end 36. A portion or substantially all of channel 30 further may extend from top surface 20 to bottom surface 22 of top panel 12 and may have a top opening 38 and a bottom opening 39 which are connected such that channel 30 forms a passageway from top surface 20 to bottom surface 22 of top panel 12. As shown in detail in FIG. 2A, in one embodiment, channel 30 has a cross-sectional shape similar to that of a horizontally disposed S. Accordingly, in certain embodiments of article of furniture 10, at least a portion of bottom opening 39 of channel 30 may be disposed behind top opening 38. In various embodiments, for example, all of bottom opening 39 may be disposed behind top opening 38. By having bottom opening 39 behind top opening 38, a device 50 the possibility that a device 50 could fall through channel 30 may be reduced or eliminated.

Accordingly, channel 30 may have an upper front wall 31a, a lower front wall 31b disposed a first horizontal distance $X_1$ from upper front wall 31a, and a lower ledge 32b. Channel 30 may further have an upper rear wall 33a, a lower rear wall 33b, and an upper ledge 32a. Upper rear wall 33a may be disposed a second horizontal distance $X_2$ from upper front wall 31a thereby forming top opening 38 and at least a portion of lower rear wall 33b may be disposed a third horizontal distance $X_3$ from lower front wall 31b thereby forming bottom opening 39. In various embodiments, for example, second horizontal distance $X_2$ may be from about 0.635 centimeters (about 0.25 inches) to about 3.175 centimeters (about 1.25 inches). In certain embodiments, for example, second horizontal distance $X_2$ may be about 0.635 centimeters (about 0.25 inches), about 0.953 centimeters (about 0.375 inches), about 1.27 centimeters (about 0.5 inches), about 1.588 centimeters (about 0.625 inches), about 1.905 centimeters (about 0.75 inches), about 2.54 centimeters (about 1 inch), or about 3.175 centimeters (about 1.25 inches). In certain embodiments, the second horizontal distance $X_2$ from upper front wall 31a to upper rear wall 33a is less than or equal to the first horizontal distance $X_1$ from upper front wall 31a to lower front wall 31b (i.e., $X_2 \leq X_1$). In various embodiments, for example, second horizontal distance $X_2$ may be from about zero centimeters (about zero inches) to about 1.905 centimeters (about 0.75 inches) less than first horizontal distance $X_1$. In certain embodiments, for example, horizontal distance $X_2$ may be about zero centimeters (about zero inches), 0.635 centimeters (about 0.25 inches), about 0.953 centimeters (about 0.375 inches), about 1.27 centimeters (about 0.5 inches), about 1.588 centimeters (about 0.625 inches), or about 1.905 centimeters (about 0.75 inches) less than first horizontal distance $X_1$. Additionally, upper ledge 32a may be disposed a first vertical distance $Y_1$ from lower ledge 32b.

Figure 2:
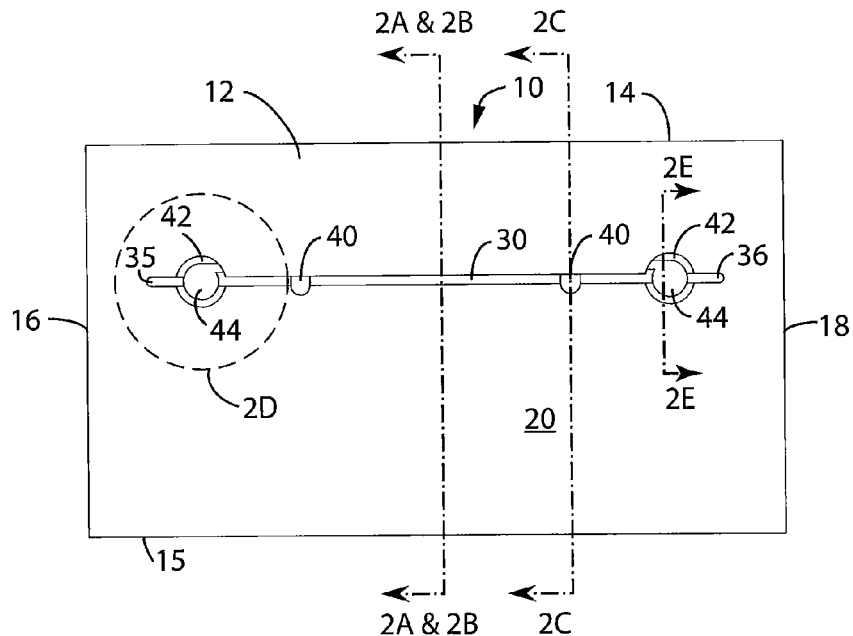
FIG. 2 is a top view of an article of furniture according to one embodiment of the invention.
Figure 2A:
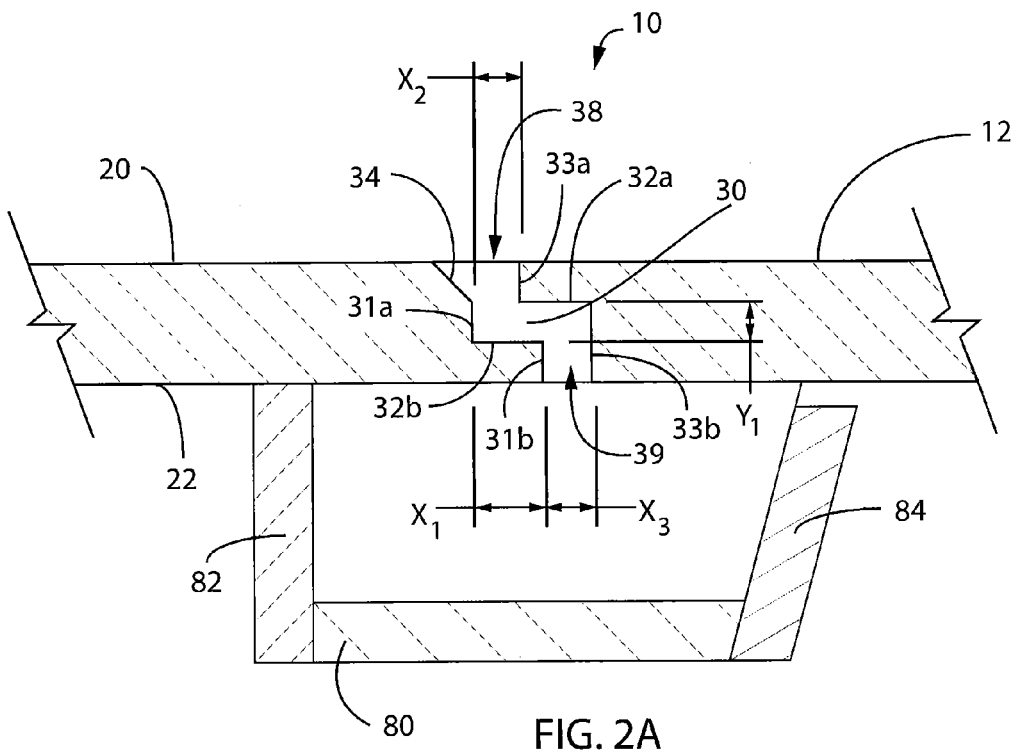
FIG. 2A is a right cross section view of a channel of an article of furniture according to one embodiment of the invention.
Figure 2B:
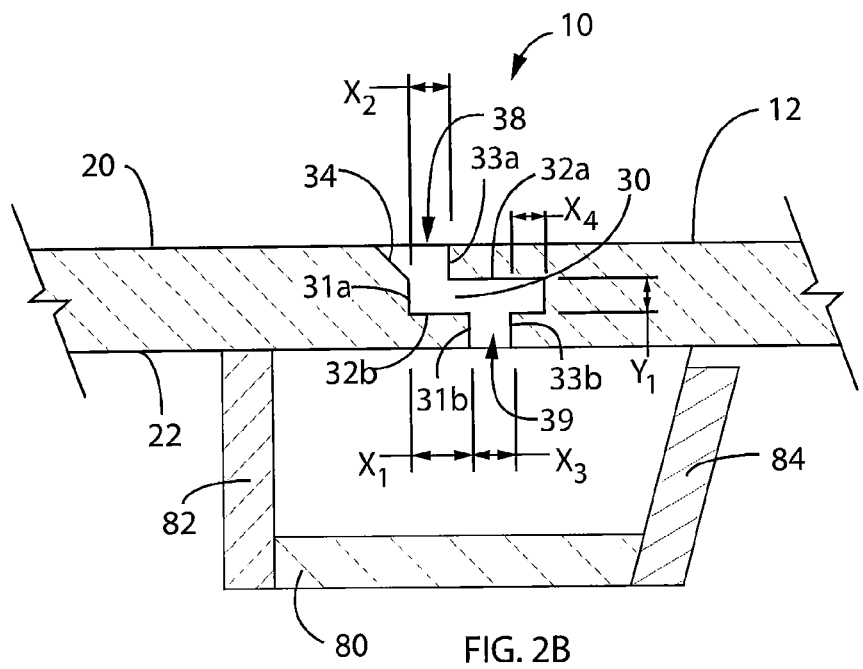
FIG. 2B is a right cross section view of a channel of an article of furniture according to one embodiment of the invention.

Additionally, in various other embodiments, as illustrated in FIG. 2B, an upper portion of lower rear wall 33b may extend a fourth horizontal distance $X_4$ from a lower portion of lower rear wall 33b. This additional distance may be due to various manufacturing techniques used to construct channel 30. Accordingly, upper front wall 31a, lower front wall 31b, lower ledge 32b, upper rear wall 33a, lower rear wall 33b and upper ledge 32a of channel 30 cooperate to form a passageway from top surface 20 and bottom surface 22 of top panel.

While in certain embodiments, the second horizontal distance $X_2$ from upper front wall 31a to upper rear wall 33a may be fixed, in other embodiments, upper rear wall 33a may be adjustable such that the second horizontal distance $X_2$ can be movably decreased or increased. This may assist in permitting larger and/or thicker devices 50 to be inserted into channel 30 (e.g., devices 50 with protective cases). In various embodiments where upper rear wall 33a may be adjustable, the first horizontal distance $X_1$ from lower front wall 31b to upper front wall 31a may be greater than the range of adjustable second horizontal distances $X_{2min}$ to $X_{2max}$ from upper front wall 31a to upper rear wall 33a. This may assist in preventing device 50 from falling through bottom opening 39 when upper rear wall 33a is adjusted such that second horizontal distance is at its maximum position $X_{2max}$.

Figure 2C:
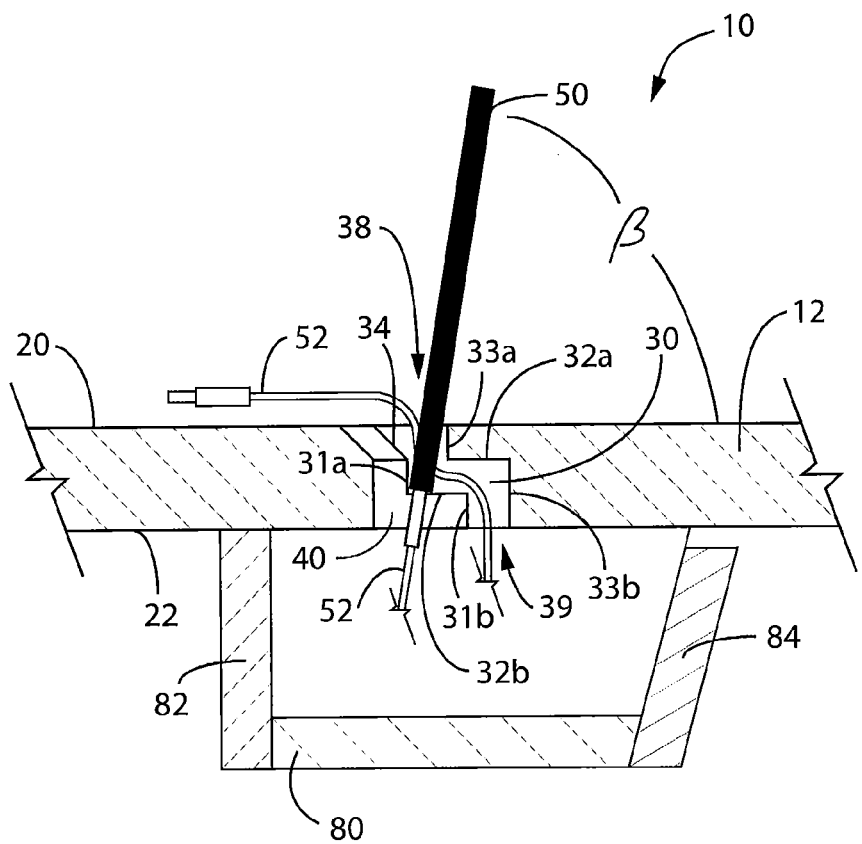
FIG. 2C is a right cross section view of a device inserted into a channel of an article of furniture according to one embodiment of the invention.

As shown in FIG. 2C, one or more wires or cables 52 may be extended through channel 30. The shape of channel 30 permits device 50 to be placed in channel 30 and one or more wires 52 to extend through channel 30 without device 50 falling through channel 30. Thus a side of device 50 may rest on bottom ledge 32b of channel 30 and may contact upper front wall 31a of channel 30, while a back or front side of device 50 may rest on upper back wall 33a of channel 30. Accordingly, device 50 may be inserted into channel 30 through top opening 38 so that it can be oriented in an upright position. In various embodiments, device 50 can be inserted into channel 30 such that an angle β between the back or front side of device 50 and top surface 20 of top panel 12 is about 90° or less. In certain embodiments, for example, the angle β between the back or front side of device 50 and top surface 20 of top panel 12 may be about 90° or less, about 80° or less, about 70° or less, about 60° or less, about 50° or less, about 40° or less, about 30° or less, about 20° or less, or about 10° or less. In certain embodiments, a round or chamfer 34 may be disposed at the intersection of top surface 20 of top panel 12 and front wall 31 of channel 30. The round or chamfer 34 may assist in providing access to a portion of device 50 that is inserted into channel 30. This may assist in permitting a user to operate physical or electronic buttons or switches and/or interact with the screen of device 50.

Figure 5:
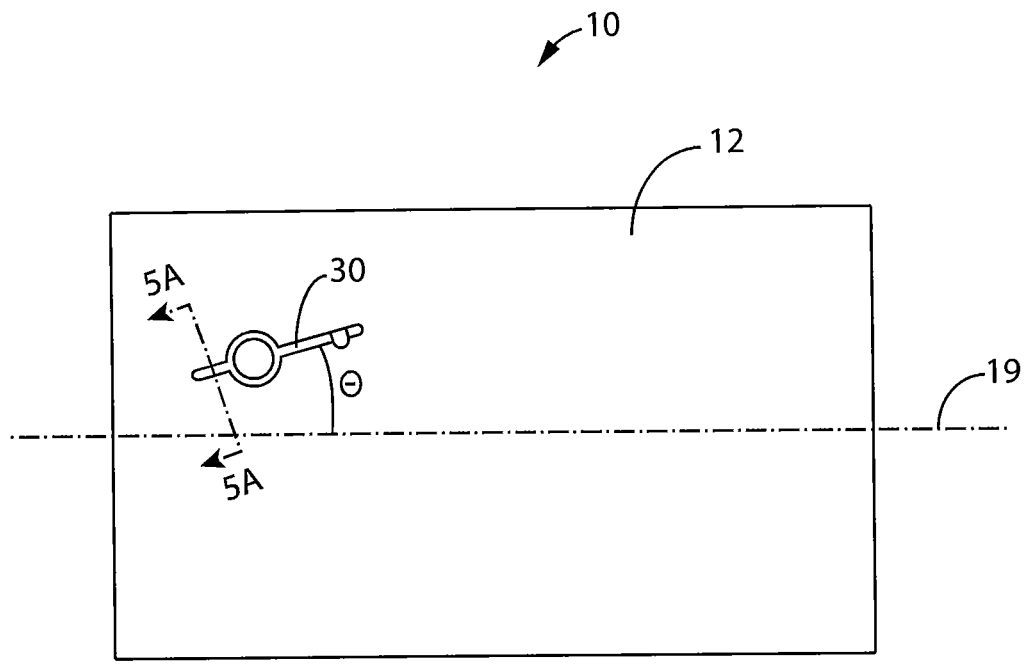
FIG. 5 is a top view of an article of furniture according to one embodiment of the invention.
Figure 5A:
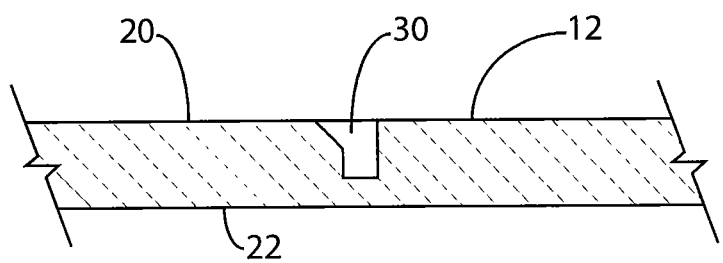
FIG. 5A is a right section view of a channel of an article of furniture according to one embodiment of the invention.

By having channel 30 extend a length parallel to top surface 20 of top panel 12, a user can insert a device 50 into channel 30 and can additionally slide device 50 along channel 30 and place it in a different location along channel 30 without having to remove device 50 from channel 30. Additionally, if a wire 52 is plugged into device 50, device 50 can slide along channel 30 without having to disconnect device 50 from wire 52 or remove device 50 from channel 30 to place it in a different location along channel 30. Device 30 may therefore be easily moved along channel 30. Wire 52 may be any type of wire or cable known in the art, including but not limited to, a Universal Service Bus (USB) cable, an RCA cable, an optical cable, a High-Definition Multimedia Interface (HDMI) cable, a TS, TRS, or TRRS cable (e.g., a 3.5 mm audio jack), a Digital Visual Interface (DVI) cable, a serial cable, a Video Graphics Array (VGA) cable, or any signal communication cable now known or hereinafter developed. In other embodiments, for example, wire 52 may include, but is not limited to, a power cord, a charging cable, or any power transmission cable now known or hereinafter developed. In yet other embodiments, for example, wire 52 may include, but is not limited to, a security cable, a locking cable, etc. In various embodiments, channel 30 extends from top surface 20 to bottom surface 22 of top panel 12 and includes a top opening 38 and a bottom opening 39 such that channel 30 forms a passageway from top surface 20 to bottom surface 22 of top panel 12; however, in certain embodiments, as shown in FIG. 5A, channel 30 is blind such that channel 30 only has a top opening 38 in top surface 20 of top panel 12 (i.e., channel 30 does not extend all the way through to bottom surface 22 of top panel 12).

Figure 2D:
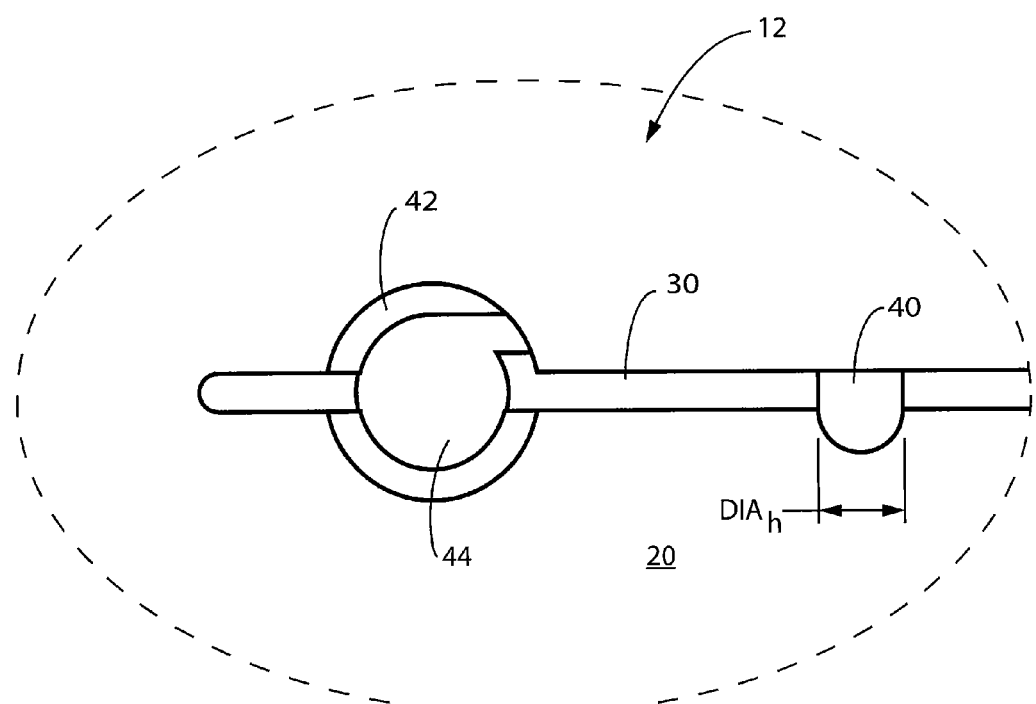
FIG. 2D is a top detail view of a channel, a recess and small and primary holes of an article of furniture according to one embodiment of the invention.

Returning again to FIG. 2, certain embodiments of top panel 12 may optionally include one or more secondary holes 40. In certain embodiments, one or more secondary holes 40 may be disposed in channel 30 at various locations along the length of channel 30 and may extend from bottom ledge 32b of channel 30 to bottom surface 22 of top panel 12. Any number of secondary holes 40 may be disposed in channel 30 as desired without departing from the scope of the invention. In other embodiments as shown in FIGS. 2C and 2D, for example, one or more secondary holes 40 may extend from top surface 20 to bottom surface 22 of top panel through bottom ledge 32b. In certain embodiments, the one or more secondary holes 40 may be substantially circular in shape, however, it will be understood that the one or more secondary holes 40 may be any shape without departing from the scope of the invention. In other embodiments, for example, secondary holes 40 may be substantially U-shaped. The one or more secondary holes 40 may be sized to permit a wire 52 to be threaded through secondary holes 40. By threading wire 52 through secondary holes 40, the ease with which wire 52 may be plugged into device 50 may be increased. Additionally as shown in FIG. 2C, secondary holes 40 may be sized so that device 50 may be inserted into channel 30 directly above secondary holes 40 without falling through secondary holes 40. In embodiments where one or more secondary holes 40 are substantially circular or substantially U-shaped, one or more secondary holes 40 may have a diameter $DIA_h$ from about 1.905 centimeters (about 0.75 inches) to about 6.35 centimeters (about 2.5 inches). In certain embodiments, for example, secondary holes 40 have a diameter $DIA_h$ of about 1.905 centimeters (about 0.75 inches), about 2.54 centimeters (about 1 inch), about 3.81 centimeters (about 1.5 inches), about 5.08 centimeters (about 2 inches), or about 6.35 centimeters (about 2.5 inches). Device 50 can be plugged into wire 52 and can still rest against bottom ledge 32b of channel 30 with little or no interference by wire 52 (e.g., wire 52 is minimally contorted or bent such that device 50 fails to properly fit in channel 30). In certain embodiments, one or more secondary holes 40 may be connected to channel 30 such that after wire 52 is inserted into one or more secondary holes 40, wire can then slide along channel 30 to another location along channel 30 without requiring wire 52 to be removed.

In various embodiments, as shown in FIGS. 1, 2 and 2C, top panel 12 may also optionally include one or more recesses 42. One or more recesses 42 may be disposed in channel 30 at various locations along the length of channel 30. Any number of recesses 42 may be disposed in channel 30 as desired without departing from the scope of the invention. Recesses 42 may extend a depth $d_R$ into top panel 12 from top surface 20 of top panel 12. Accordingly, one or more recesses 42 may have a bottom wall 43 at depth $d_R$ from top surface 20 of top panel 12. In certain embodiments, for example, the depth $d_R$ of one or more recesses 42 may be about 5 percent to about 100 percent of the thickness T of top panel 12. In certain embodiments, for example, the depth $d_R$ of one or more recesses 42 may be about 5 percent, about 10 percent, about 15 percent, about 20 percent, about 25 percent, about 30 percent, about 35 percent, about 40 percent, about 45 percent about 50 percent, about 55 percent, about 60 percent, about 65 percent, about 70 percent, about 75 percent, about 80 percent, about 85 percent, about 90 percent, about 95 percent, or about 100 percent of the thickness T of top panel 12. In other embodiments, for example, the depth $d_R$ of one or more recesses 42 may be from about 0.635 centimeters (about 0.25 inches) to about 3.175 centimeters (about 1.25 inches). In certain embodiments, for example, the depth $d_R$ of one or more recesses 42 may be about 0.635 centimeters (about 0.25 inches), about 0.953 centimeters (about 0.375 inches), about 1.27 centimeters (about 0.5 inches), about 1.588 centimeters (about 0.625 inches), about 1.905 centimeters (about 0.75 inches), about 2.54 centimeters (about 1 inch), or about 3.175 centimeters (about 1.25 inches). One or more recesses 42 may assist in providing access to a portion of device 50 that is inserted into channel 30. This may assist in permitting a user to operate physical or electronic buttons or switches and/or interact with the screen of device 50.

As shown in FIGS. 1, 2, 2D and 2E, in certain embodiments, one or more recesses 42 may be substantially circular in shape, however, it will be understood that one or more recesses 42 may be any shape without departing from the scope of the invention. In embodiments where one or more recesses 42 are substantially circular in shape, one or more recesses 42 may have a diameter $DIA_R$ from about 1.905 centimeters (about 0.75 inches) to about 20.32 centimeters (about 8 inches). In certain embodiments, for example, one or more recesses 42 may have a diameter $DIA_R$ of about 1.905 centimeters (about 0.75 inches), about 2.54 centimeters (about 1 inch), about 3.81 centimeters (about 1.5 inches), about 5.08 centimeters (about 2 inches), about 6.35 centimeters (about 2.5 inches), about 7.62 centimeters (about 3 inches), about 8.89 centimeters (about 3.5 inches), about 10.16 centimeters (about 4 inches), about 11.43 centimeters (about 4.5 inches), about 12.7 centimeters (about 5 inches), about 13.97 centimeters (about 5.5 inches), about 15.24 centimeters (about 6 inches), about 16.51 centimeters (about 6.5 inches), about 17.78 centimeters (about 7 inches), about 19.05 centimeters (about 7.5 inches), or about 20.32 centimeters (about 8 inches).

Figure 2E:
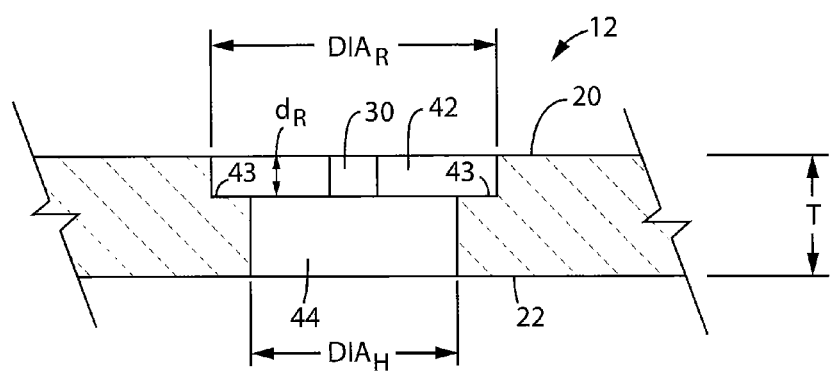
FIG. 2E is a left section view of a recess and a primary hole of an article of furniture according to one embodiment of the invention.

In various embodiments, as illustrated in FIGS. 2, 2D and 2E, top panel 12 may also optionally include one or more primary holes 44 extending from bottom 43 of one or more recesses 42 to bottom surface 22 of top panel 12. One or more primary holes 44 may be disposed in channel 30 at various locations along the length of channel 30. Any number of primary holes 44 may be disposed in channel 30 as desired without departing from the scope of the invention. The one or more primary holes 44 may be sized to permit a wire 52 to be threaded through primary holes 44. One or more primary holes 44 may have a larger open area than the one or more secondary holes 40 and thus may permit a larger wire 52 to be threaded through primary holes 44 than could be threaded through secondary holes 40. By threading wire 52 through primary holes 44, the ease with which wire 52 may be plugged into device 50 may be increased. Additionally, primary holes 44 may be sized so that device 50 may be inserted into channel 30 directly above primary holes 44 without falling through primary holes 44. Device 50 can be plugged into wire 52 and can still rest against bottom ledge 32b of channel 30 with little to no interference by wire 52 (e.g., wire 52 is minimally contorted or bent such that device 50 fails to properly fit in channel 30). In certain embodiments, one or more primary holes 44 may be connected to channel 30 such that after wire 52 is inserted into one or more primary holes 44, wire can then slide along channel 30 to another location along channel 30 without requiring wire 52 to be removed.

Again referring to FIGS. 2, 2D and 2E, in various embodiments, one or more primary holes 44 may be substantially circular in shape, however, it will be understood that one or more primary holes 44 may be any shape without departing from the scope of the invention. In embodiments where one or more primary holes 44 are substantially circular in shape, one or more primary holes 44 may have a diameter $DIA_H$ from about 1.905 centimeters (about 0.75 inches) to about 20.32 centimeters (about 8 inches). In certain embodiments, for example, one or more primary holes 44 may have a diameter $DIA_H$ of about 1.905 centimeters (about 0.75 inches), about 2.54 centimeters (about 1 inch), about 3.81 centimeters (about 1.5 inches), about 5.08 centimeters (about 2 inches), about 6.35 centimeters (about 2.5 inches), about 7.62 centimeters (about 3 inches), about 8.89 centimeters (about 3.5 inches), about 10.16 centimeters (about 4 inches), about 11.43 centimeters (about 4.5 inches), about 12.7 centimeters (about 5 inches), about 13.97 centimeters (about 5.5 inches), about 15.24 centimeters (about 6 inches), about 16.51 centimeters (about 6.5 inches), about 17.78 centimeters (about 7 inches), about 19.05 centimeters (about 7.5 inches), or about 20.32 centimeters (about 8 inches). In certain embodiments wherein both one or more recesses 42 and one or more primary holes 44 are both substantially circular, the one or more recesses 42 and the one or more primary holes 44 may be substantially concentric.

Channel 30 may extend any length along top surface 20. In various embodiments, for example, channel 30 may extend any length from left terminal end 35 (see FIG. 2) to right terminal end 36 (see FIG. 2) about 5 percent to about 100 percent of the width of top panel 12 along major axis 19. In certain embodiments, channel 30 may extend from left terminal end 35 to right terminal end 36 about 5 percent, about 10 percent, about 20 percent, about 30 percent, about 40 percent, about 50 percent, about 60 percent, about 70 percent, about 80 percent, about 90 percent, or about 100 percent of the width of top panel 12 along major axis 19. In other embodiments, for example, channel 30 may extend any length from left terminal end 35 to right terminal end 36 from about 5.08 centimeters (about 2 inches) to about 254 centimeters (about 100 inches) or more. In certain embodiments, channel 30 may extend from left terminal end 35 to right terminal end 36 about 5.08 centimeters (about 2 inches) or more, about 15.24 centimeters (about 6 inches) or more, about 30.48 centimeters (about 12 inches) or more, about 60.96 centimeters (about 24 inches) or more, about 91.44 centimeters (about 36 inches) or more, about 121.92 centimeters (about 48 inches) or more, about 152.4 centimeters (about 60 inches) or more, about 182.88 centimeters (about 72 inches) or more, about 213.36 centimeters (about 84 inches) or more, or about 254 inches (about 100 inches) or more. In certain embodiments, for example, channel 30 may extend a length from left terminal end 35 to right terminal end 36 of about 27.94 centimeters (about 11 inches). In other embodiments, for example, channel 30 may extend a length from left terminal end 35 to right terminal end 36 of about 121.92 centimeters (about 48 inches). It will be understood that channel 30 may extend any length without departing from the scope of the invention. While channel 30 has been show as extending substantially linearly, it will be understood that in other embodiments of article of furniture 10, channel 30 may extend along a curve in top panel 12 without departing from the scope of the invention.

Channel 30, in various embodiments as illustrated in FIGS. 1 and 2, may be disposed substantially parallel with major axis 19 of top panel 12. However, in other embodiments, as shown in FIG. 5, channel 30 may be disposed at any angle Θ with respect to major axis 19 of top panel 12. Accordingly, in various embodiments, for example, angle Θ may be any angle from about 0° to about 90°. In certain embodiments, for example, angle Θ may be about 0°, about 10°, about 20°, about 30°, about 40°, about 50°, about 60°, about 70°, about 80°, or about 90°). In one embodiment, angle Θ may be about 15°. By angling channel 30 with respect to major axis 19 of top panel 12, a device 50 inserted into channel 30 may be disposed at an angle which assists in viewing device 50 by a user of the article of furniture 10. This may be particularly beneficial if a user is using a laptop or desktop computer which is on top panel 12 wherein the monitor of the laptop or desktop computer is disposed substantially parallel to major axis 19 of top panel 12. If a channel 30 is disposed to a left or right side of where the laptop or desktop computer is disposed and channel 30 is also disposed at an angle Θ with respect to major axis 19 of top panel 12, a user can insert a device 50 into channel 30. If a user wishes to divert their attention from the laptop or desktop computer to device 50, the user can easily turn their head slightly to view device 50.

Figure 3A:
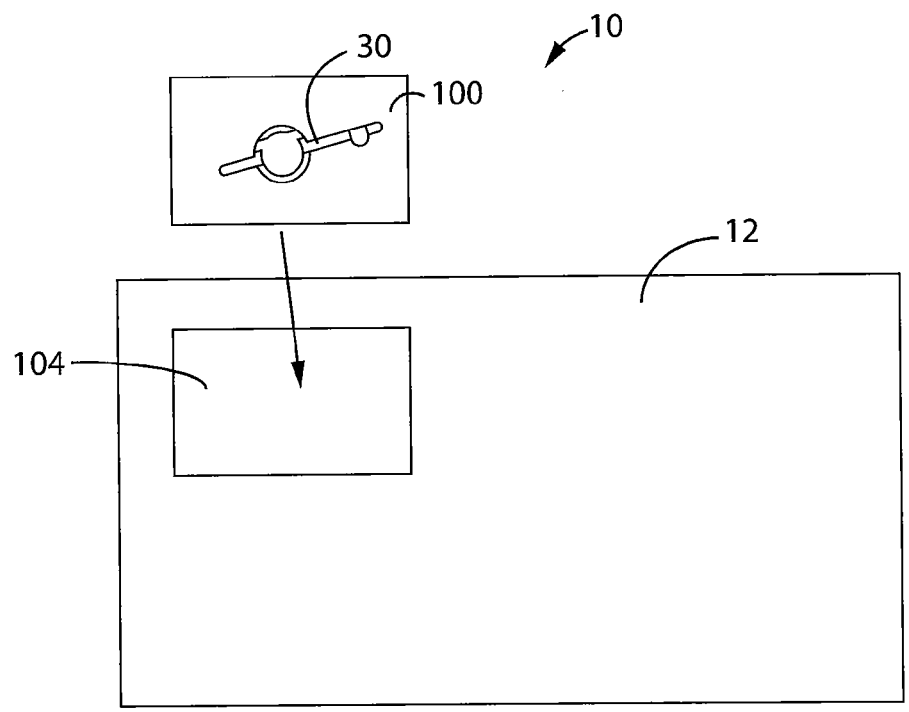
FIG. 3A is a top view of a removable panel to be inserted into a top panel of an article of furniture according to one embodiment of the invention.
Figure 3B:
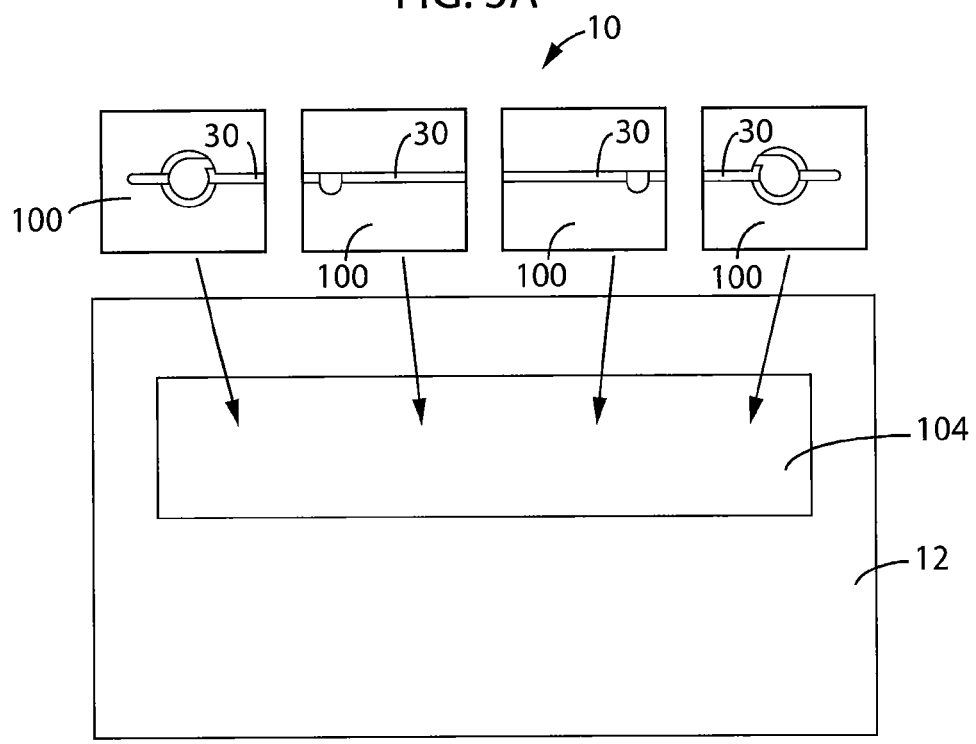
FIG. 3B is a top view of more than one removable panel to be inserted into a top panel of an article of furniture according to one embodiment of the invention.

While embodiments of channel 30 have been described where channel 30 is formed in top panel 12, in other embodiments, as illustrated in FIG. 3A, channel 30 may be disposed in a panel 100 which may be removably inserted into top panel 12. Top panel 12 may include one or more panel receiving areas 104 into which one or more removable panels 100 which may be inserted to form channel 30. When removable panel 100 is inserted into panel receiving area 104, the top surface of removable panel 100 may be substantially co-planar or flush with top surface 20 of top panel 12. In certain embodiments, for example, one removable panel 100 comprising the entirety of channel 30 may be inserted into one or more panel receiving areas 104. In other embodiments as illustrated in FIG. 3B, for example, two or more removable panels 100 may be inserted into one or more panel receiving areas 104 wherein each removable panel 100 includes a portion of channel 30 and the two or more removable panels 100 cooperate to form the entire length of channel 30. Removable panels 100 and panel receiving areas 104 may be any shape including, but not limited to, rectangular, square, circular, hexagonal, octagonal, etc. In certain embodiments, for example, removable panel 100 and panel receiving area 104 may each be circular and removable panel 100 may be inserted into panel receiving area 104 such that channel 30 may be disposed at an angle Θ with respect to major axis 19 of top panel 12, as described more fully elsewhere herein.

Figure 3C:
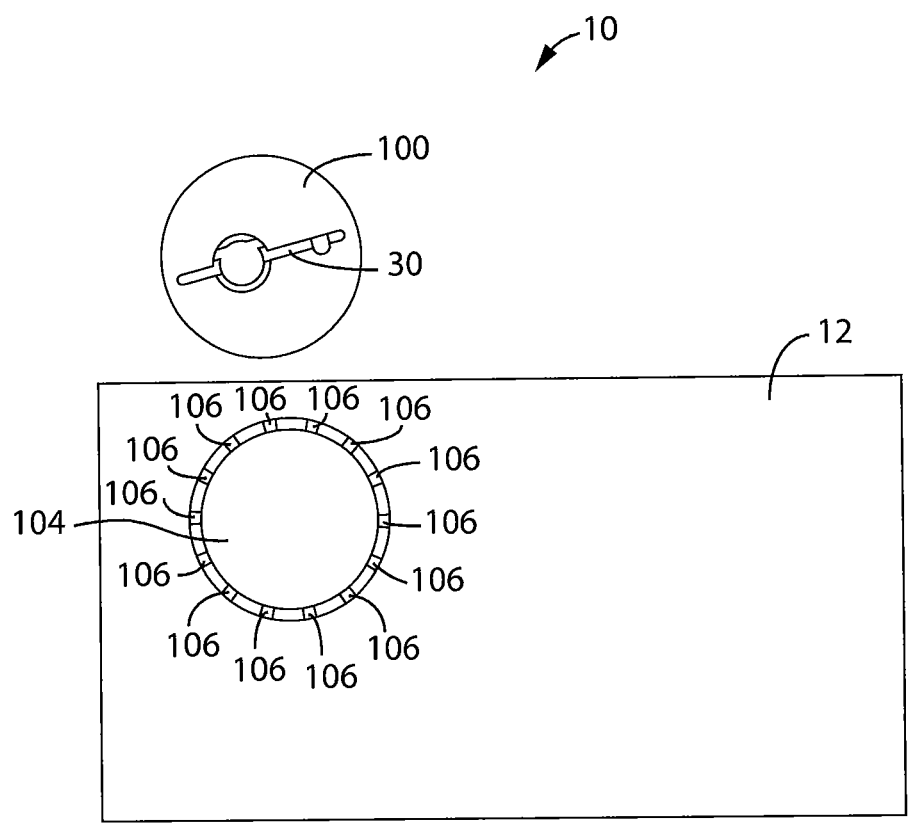
FIG. 3C is a top view of a circular removable panel to be inserted into a top panel of an article of furniture according to one embodiment of the invention.
Figure 3D:
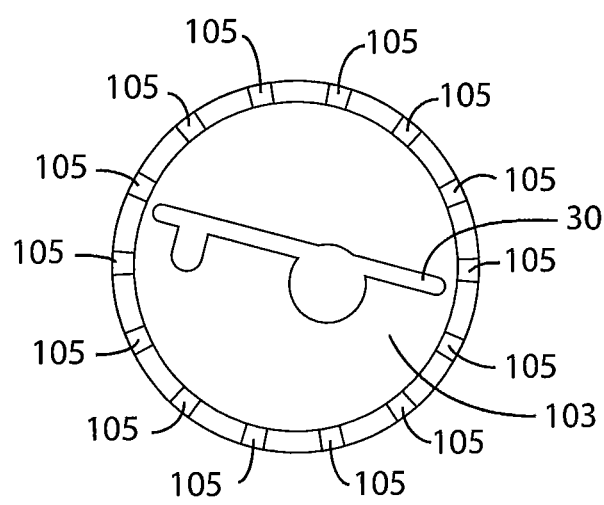
FIG. 3D is a bottom view of a circular removable panel to be inserted into a top panel of an article of furniture according to one embodiment of the invention.

As illustrated in FIGS. 3C and 3D, certain embodiments of the bottom surface 103 of removable top panel 100 may optionally include a population radially spaced lugs 105 which may be adapted to cooperate with a population of radially spaced indentations 106 in panel receiving area 104 in order to prevent removable panel 102 from spinning in panel receiving area 104. Lugs 105 and indentations 106 may thus aid in maintaining the angle Θ of channel 30 with respect to major axis 19 of top panel 12. In other embodiments, the lugs 105 and indentations 106 may be switched such that bottom surface 103 of removable top panel 100 may include a population radially spaced indentations 106 which may be adapted to cooperate with a population of radially spaced lugs 105 in panel receiving area 104.

As illustrated in FIGS. 2A, 2B, 2C, 2D and 2E, in certain embodiments of the invention, top panel 12 may be a single piece; however in other embodiments of the invention, top panel 12 may comprise multiple panels which may be secured to one another in a variety of ways, including, but not limited to, screws, nails, staples, adhesives, etc. FIGS. 4 and 4A illustrate one embodiment of top panel 12 which may be formed of a first panel 60, a second panel 61 and a third panel 62. First panel 60 may include first channel portion 63, second panel 61 may include second channel portion 64, and third panel 62 may include third channel portion 65. Thus, in certain embodiments, first panel 60, second panel 61 and third panel 62 may be secured to one another in order to form top panel 12 having channel 30. Accordingly, first channel portion 63, second channel portion 64 and third channel portion 65 may cooperate to form channel 30 which may include all of the features of channel 30 as described more fully elsewhere herein.

Specifically, certain embodiments of first channel portion 63 may include a slot 66 and one or more holes 67. Slot 66 may extend a length to form at least a portion of left terminal end 35 and right terminal end 36 of channel 30. A front wall 66a of slot 66 may form at least a portion of upper front wall 31a of channel 30 (see FIG. 2A) and a rear wall 66b of slot 66 may form at least a portion of upper rear wall 33a of channel 30 (see FIG. 2A). A bottom surface (not shown) of first panel 60 may also form at least a portion of upper ledge 32a of channel 30. One or more holes 67a may form at least a portion of one or more recesses 42 and/or at least a portion of one or more primary holes 44 and one or more holes 67b may form at least a portion of one or more secondary holes 40. Additionally, certain embodiments of second channel portion 64 may include a slot 68 and one or more holes 69a, 69b. Slot 68, including slot portions 68c and 68d may extend a length to form at least a portion of left terminal end 35 and right terminal end 36 of channel 30. A front wall 68a of slot 68 may form at least a portion of upper front wall 31a of channel 30 (see FIG. 2A) and a rear wall 68b of slot 68 may form at least a portion of lower rear wall 33b of channel 30 (see FIG. 2A). One or more holes 69a may form at least a portion of one or more recesses 42 and/or at least a portion of one or more primary holes 44 and one or more holes 69b may form at least a portion of one or more secondary holes 40. Additionally, certain embodiments of third channel portion 65 may include a slot 70, one or more holes 71a, 71b. A front wall 70a of slot 70 may form at least a portion of lower front wall 31b of channel 30 (see FIG. 2A) and a rear wall 70b of slot 70 may form at least a portion of lower rear wall 33b of channel 30 (see FIG. 2A). One or more holes 71a may form at least a portion of one or more recesses 42 and/or at least a portion of one or more primary holes 44 and one or more holes 71b may form at least a portion of one or more secondary holes 40. While FIG. 4 illustrates three panels, top panel 12 and channel 30 may be formed by any number of panels. In addition, while only two of each of holes 67, 69 and 71 are illustrated, in other embodiments, the one or more panels may each include fewer than two holes or more than two holes. Accordingly, any number of holes may be disposed in any number of panels as desired without departing from the scope of the invention.

Figure 2F:
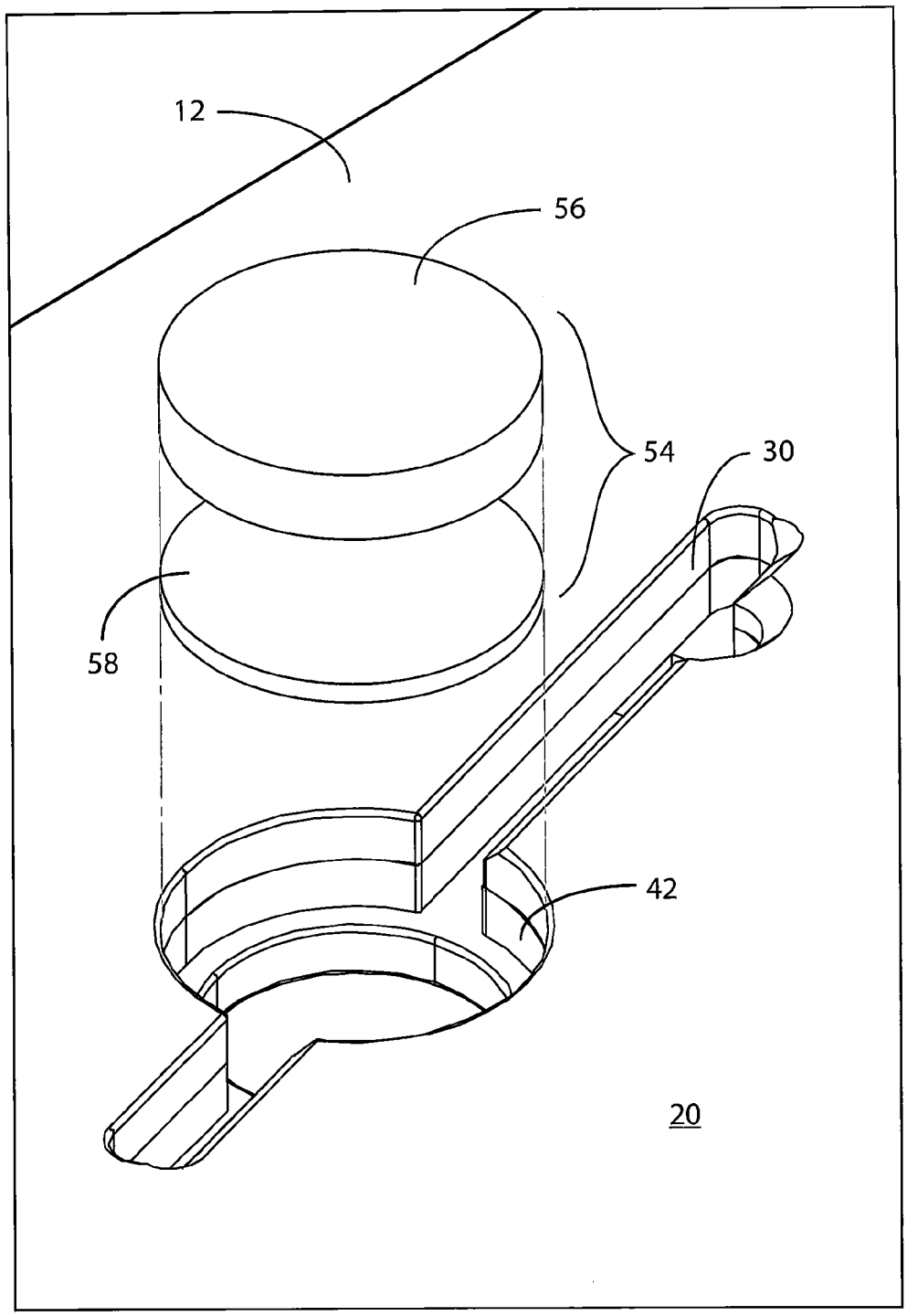
FIG. 2F is a left perspective exploded view of an eraser adapted to be inserted into a recess of an article of furniture according to one embodiment of the invention.

Article of furniture 10, including top panel 12, may be made of a variety of materials including but not limited to, pine, maple, oak, plywood, medium-density fiberboard (MDF), or other natural or engineered woods, steel, stainless steel, aluminum, titanium, copper, or other metals or metal alloys, polyvinyl chloride (PVC), Acrylonitrile butadiene styrene (ABS), polypropylene, polyethylene, polystyrene, or other plastics or polymers, carbon fiber, fiberglass, wood-plastic composites, or other composites, glass, and/or any combinations thereof. Additionally, in certain embodiments, top panel 12 may be erasably written on. In certain embodiments, for example, a portion or all of top surface 20 of top panel 12 may be erasably written on with one or more of a dry erase maker, chalk, and other writing implements. Accordingly, a portion or all of top surface 20 of top panel 12 may be, including, but not limited to, a dry erase board, painted with dry erase paint, covered with a dry erase material, a chalk board, painted with chalkboard paint, covered with a chalkboard material, and/or any combination thereof. As shown in FIG. 2F, certain embodiments of article of furniture 10 may include an eraser 54 which may be sized to fit into one or more recesses 42 for storage. Eraser 54 may include an eraser body 56 and an eraser material 58 affixed to eraser body 56 which can be adapted to erase, for example, chalk and/or dry erase marker. Additionally, in certain embodiments, a coaster, cup holder, cup, potted plant, etc. may be sized to fit into one or more recesses 42.

Figure 1B:
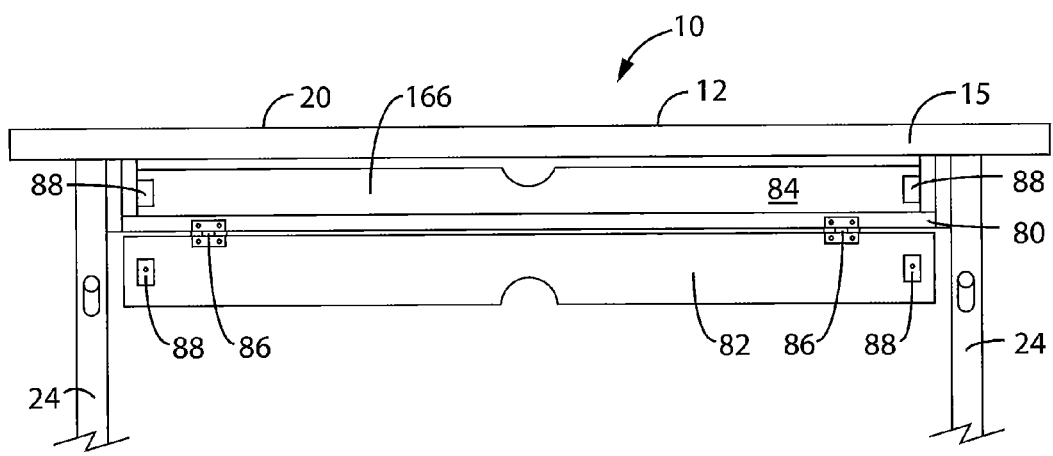
FIG. 1B is a partial front view of an article of furniture according to one embodiment of the invention.

Referring again to FIGS. 1A, 1B, 2A, 2B and 2C, certain embodiments of article of furniture 10 may optionally include a shelf or gutter 166 disposed below bottom surface 22 of top panel 12. Shelf or gutter 166 may be disposed below bottom surface 22 of top panel 12 proximate channel 30 so that portions or all of wires 52 may be stored in shelf or gutter 166. Additionally, shelf or gutter 166 may house a variety of objects including, but not limited to, wires 52, hard drives, surge protectors, etc. Shelf or gutter 166 may comprise a horizontal shelf 80. Shelf or gutter 166 may optionally include a front shelf wall 82 and/or a rear shelf wall 84. In certain embodiments, a portion or all of front shelf wall 82 may be rotatably connected to bottom surface 22 or horizontal shelf 80 to permit access to horizontal shelf 80. Additionally or alternatively, in other embodiments, a portion or all of rear shelf wall 84 may be rotatably connected to bottom surface 22 or horizontal shelf 80 to permit access to horizontal shelf 80. As shown in FIG. 1B, front shell wall 82 may rotatably connected to horizontal shelf 80 via hinges 86 and/or may be kept closed via magnet assemblies 88.

While any type of construction of article of furniture 10 known in the art may be used, in certain embodiments article of furniture 10 may be shipped and/or sold substantially flat and may be ready to assemble (RTA). One embodiment of the article of furniture 10 described herein is illustrated in FIGS. 6, 6A, 6B, 6C and 6D. In various embodiments, article of furniture 10 may be a table or desk. Article of furniture 10 includes a top panel 12, a left leg member 126a, a right leg member 126b, and a cross member assembly 150. Many prior art ready to assembly or flat pack article of furniture require an end user, such as a customer or purchaser of the article of furniture, to use additional tools or fasteners for final assembly of the furniture. However, the components of embodiments of article of furniture 10, may be adapted to be assembled into an article of furniture without the use of additional tools or traditional fasteners such as nails, screws, cam locks, etc. for final assembly. Accordingly, each of these components may be inserted into or interlocked with the other components to assemble article of furniture 10. Additionally, article of furniture 10 can be disassembled and reassembled without any additional tools or fasteners. As described above, top panel 12 may have a back portion 14, a front portion 15, a left-hand portion 16, a right-hand portion 18, and a major axis 19 (see FIGS. 1, 5). Top panel 12 also has a top surface 20 (see FIGS. 1, 2), a bottom surface 22 (see FIGS. 2A, 2B, 2C) and a thickness between top surface 20 and bottom surface 22.

Figure 6:
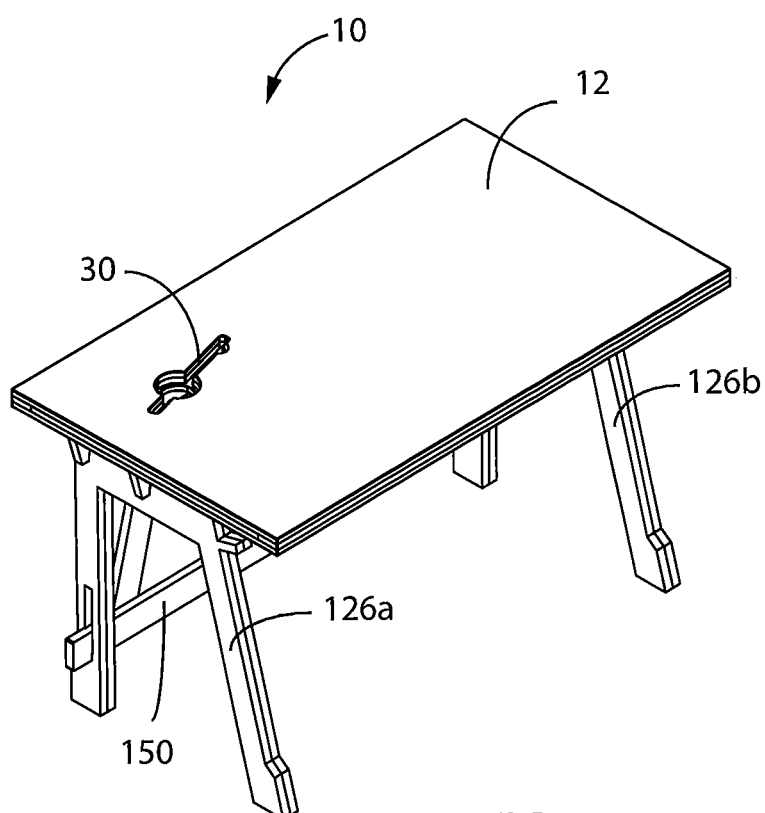
FIG. 6 is a left perspective view of an article of furniture according to one embodiment of the invention.
Figure 6A:
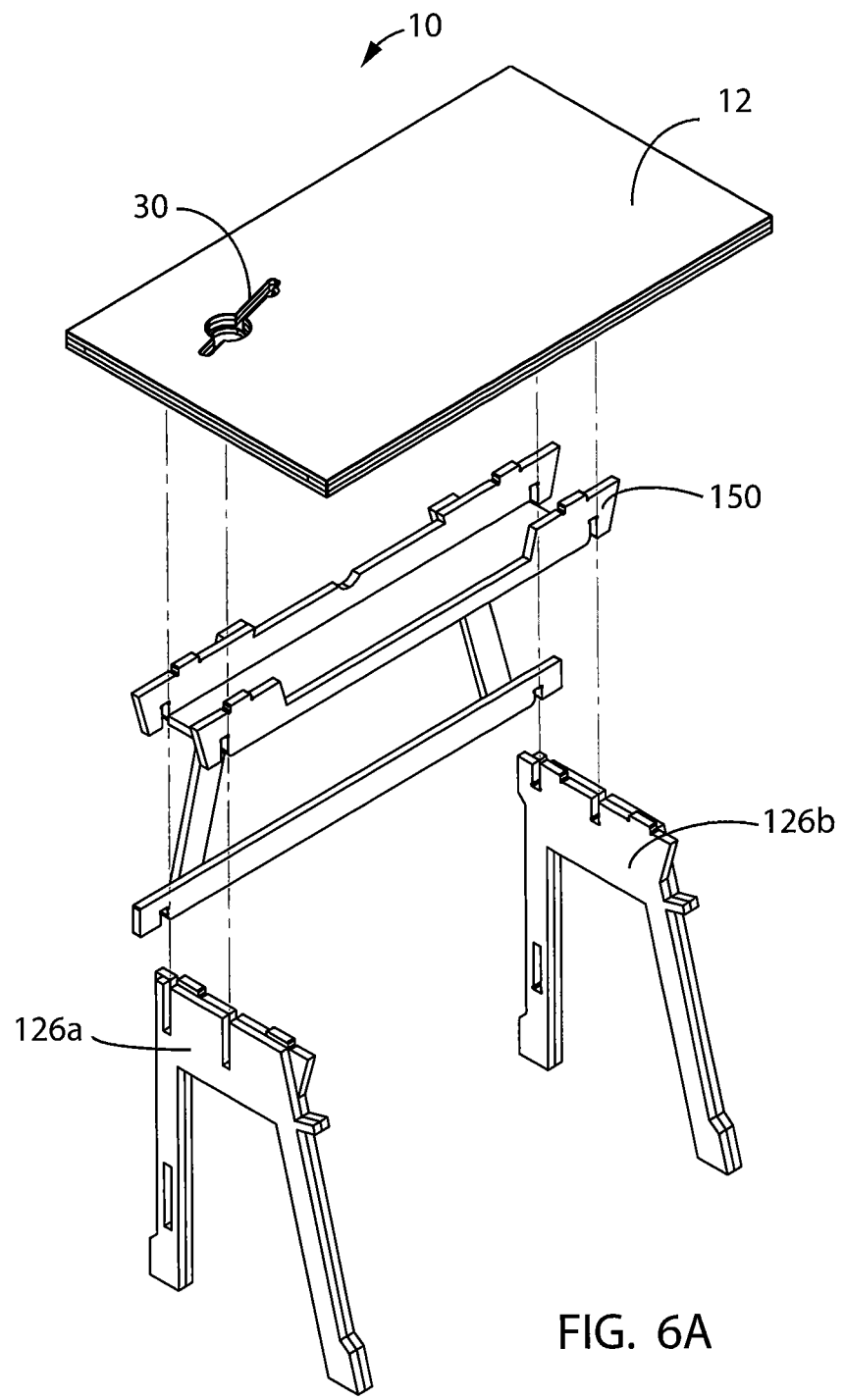
FIG. 6A is an left perspective exploded view of a top panel, left leg member, right leg member and cross member assembly of an article of furniture according to one embodiment of the invention.
Figure 6B:
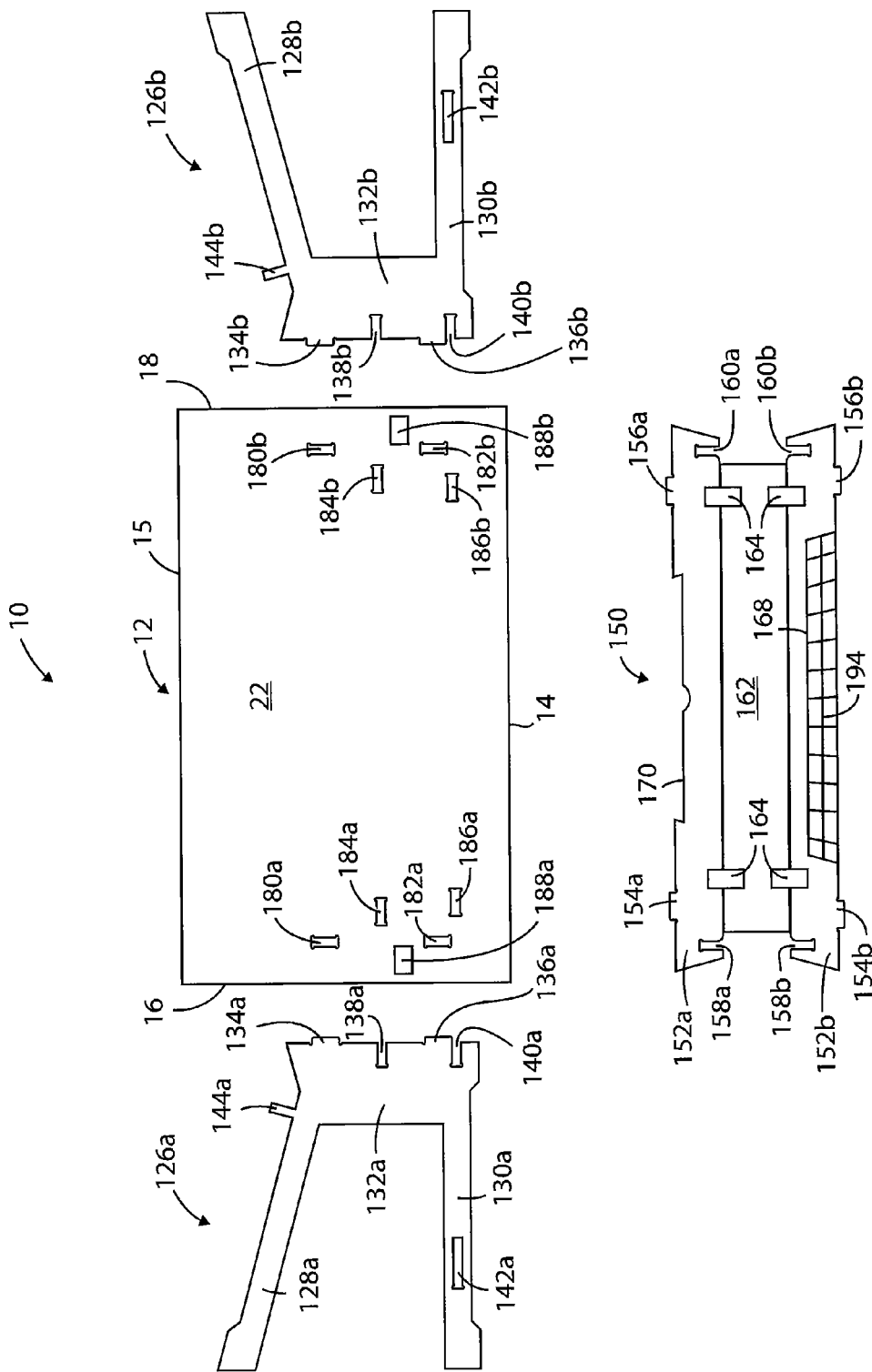
FIG. 6B is an exploded view of a top panel, left leg member, right leg member and cross member assembly of an article of furniture according to one embodiment of the invention.

As shown in detail in FIG. 6B, top panel 12 may also include a population of slots. In one embodiment, for example, top panel 12 may include a first left-hand slot 180a and a second left-hand slot 182a disposed on bottom surface 22 proximate left-hand portion 15 of top panel 12. A third left-hand slot 184a and a fourth left-hand slot 186a may disposed substantially perpendicular to first and second left-hand slots 180a, 182a on bottom surface 22. In other embodiments, for example, third left-hand slot 184a and fourth left-hand slot 186a may disposed at any angle less than or greater than 90° with respect to first and second left-hand slots 180a, 182a. Additionally, disposed on bottom surface 22 of top panel 12, proximate right-hand portion 18 may be a first right-hand slot 180b and a second right-hand slot 182b. A third right-hand slot 184b and a fourth right-hand slot 186b may disposed substantially perpendicular to first and second right-hand slots 180b, 182b on bottom surface 22. In other embodiments, for example, third right-hand slot 184b and fourth right-hand slot 186b may disposed at any angle less than or greater than 90° with respect to first and second right-hand slots 180b, 182b. Thus in certain embodiments, first and second left-hand slots 180a, 182a may be substantially parallel to first and second right-hand slots 180b, 182b. In other embodiments, for example, first and second left-hand slots 180a, 182a and first and second right-hand slots 180b, 182b may be disposed any angle greater than zero with respect to each other.

In various embodiments, first, second, third and fourth left-hand slots 180a, 182a, 184a, 186a and first, second, third and fourth right-hand slots 180b, 182b, 184b, 186b are blind, such that the slots do not extend all the way through to top surface 20 of top panel 12. In certain embodiments, however, first, second, third and fourth left-hand slots 180a, 182a, 184a, 186a and first, second, third and fourth right-hand slots 180b, 182b, 184b, 186b may be through slots. While only four left-hand slots and four right-hand slots are illustrated, it will be understood that a greater or lesser number of slots may be included in top panel 12 without departing from the scope of the invention.

Article of furniture 10 further includes a left leg member 126a which may include a top portion 132a and a front left-hand leg 128a and a rear left-hand leg 130a extending from the top portion 132a. A population of tabs may extend from top portion 132a of left leg member 126a opposite the direction of front and rear left-hand legs 128a, 130a. In certain embodiments, for example, the population of tabs may include first left-hand tab 134a and second left-hand tab 136a. First left-hand tab 134a and second left-hand tab 136a are adapted to be inserted into first left-hand slot 180a and second left-hand slot 182a, respectively, of top panel 12. While embodiments of left leg member 126a include two tabs extending from top portion 132a, it will be understood that one tab may extend from top portion 132a or more than two tabs may extend from top portion 132a without departing from the scope of the invention.

Top portion 132a of left leg member 126a may further include a population of notches. In certain embodiments, for example, the population of notches may include a first left-hand notch 138a and a second left-hand notch 140a. While embodiments of left leg member 126a include two notches in top portion 132a, it will be understood that one notch may be in top portion 132a or more than two notches may be in top portion 132a without departing from the scope of the invention. Additionally, in certain embodiments, for example, rear left-hand leg 130a may optionally include a slot 142a. In certain embodiments, rear left-hand leg 130a may include more than one slot 142a. In other embodiments, front left-hand leg 128a may also include a hook member 144a which may be adapted to hold a variety of items, including but not limited to, headphones, purses, bags, etc.

Article of furniture 10 further includes a right leg member 126b. In particular embodiments as shown in FIG. 6B, right leg member 126b may be configured as a mirror of left leg member 126a. Accordingly, right leg member 126b may include a top portion 132b and a front right-hand leg 128b and a rear right-hand leg 130b extending from the top portion 132b. A population of tabs may extend from top portion 132b of right leg member 126b opposite the direction of front and rear right-hand legs 128b, 130b. In certain embodiments, for example, the population of tabs may include first right-hand tab 134b and second right-hand tab 136b. First right-hand tab 134b and second right-hand tab 136b are adapted to be inserted into first right-hand slot 180b and second right-hand slot 182b, respectively, of top panel 12. While embodiments of right leg member 126b include two tabs extending from top portion 132b, it will be understood that one tab may extend from top portion 132b or more than two tabs may extend from top portion 132b without departing from the scope of the invention.

Top portion 132b of right leg member 126b may further include a population of notches. In certain embodiments, for example, the population of notches may include a first right-hand notch 138b and a second right-hand notch 140b. While embodiments of right leg member 126b include two notches in top portion 132b, it will be understood that one notch may be in top portion 132b or more than two notches may be in top portion 132b without departing from the scope of the invention. Additionally, in certain embodiments, for example, rear right-hand leg 130b may optionally include a slot 142b. In certain embodiments, rear left-hand leg 130b may include more than one slot 142b. In other embodiments, front right-hand leg 128b may also include a hook member 144b which may be adapted to hold a variety of items, including but not limited to, headphones, purses, bags, etc.

While left-hand leg member 126a and right-hand leg member 126b are illustrated with two legs, it will be understood that left-hand leg member 126a and right-hand leg member 126b may each have fewer or greater number of legs without departing from the scope of the preset invention. Additionally, it will be understood that other types of leg constructions may be used, including, but not limited to, T-legs without departing from the scope of the invention.

Figure 6C:
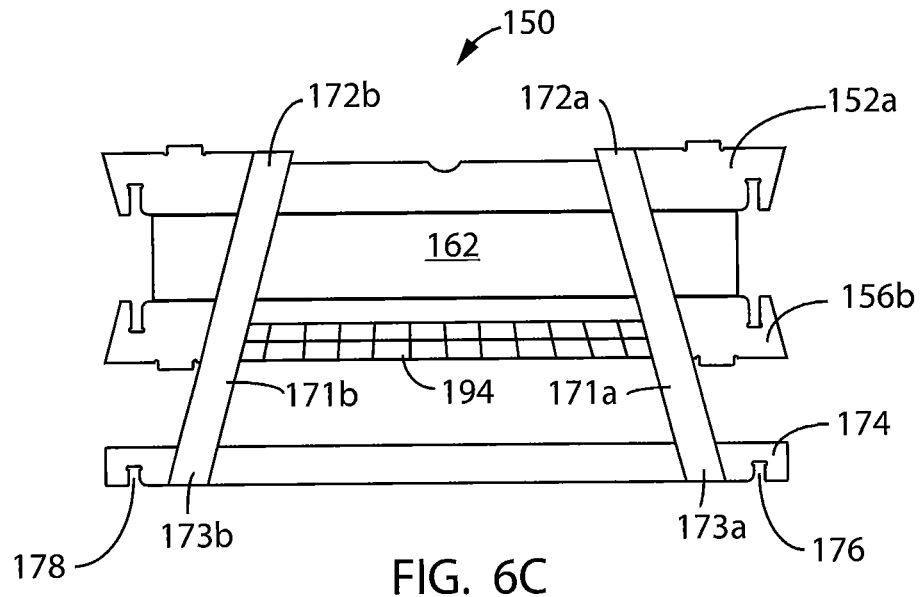
FIG. 6C is a rear view of a cross member assembly of an article of furniture according to one embodiment of the invention.
Figure 6D:
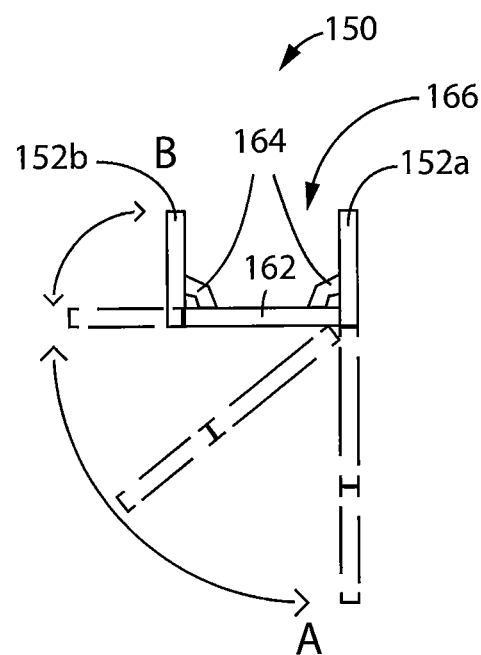
FIG. 6D is a right side view of a cross member assembly of an article of furniture according to one embodiment of the invention.

In continued reference to FIG. 6B, a cross member assembly 150 may also be included with article of furniture 10. Cross member assembly 150 may include a first rail 152a, a second rail 152b, and a shelf member 162. First rail 152a and second rail 152b may be rotatably affixed to shelf member 162 in a variety of ways including, but not limited to, hinges, fabric, plastic, rubber, etc. In other embodiments as shown in FIG. 6C, for example, cross member assembly 150 may optionally include a third rail 174 connected to first rail 152a by one or more braces 171. In certain embodiments, for example, cross member assembly 150 may include a left brace 171a and a right brace 171b. Additionally, as illustrated in FIG. 6C, left brace 171a may have a proximal end portion 172a and a distal end portion 173a wherein proximal end portion 172a is affixed to first rail 152a, and right brace 171b may have a proximal end portion 172b and a distal end portion 173b wherein proximal end portion 172b may be affixed to first rail 152a. Third rail 174 may be affixed to distal end portions 173a, 173b of left and right braces 171a, 171b, respectively.

Referring again to FIG. 6B, in various embodiments, first rail 152a may have a population of tabs and a population of notches. In certain embodiments, for example, the population of tabs may include a first left-hand tab 154a and a second right-hand tab 156a, and the population of notches may include a first left-hand notch 158a and a second right-hand notch 160a. Additionally, in various embodiments, second rail 152b may have a population of tabs and a population of notches. In certain embodiments, for example, the population of tabs may include a first left-hand tab 154b and a second right-hand tab 156b, and the population of notches may include a first left-hand notch 158b and a second right-hand notch 160b. Additionally, in various embodiments that include third rail 174, as shown in FIG. 6C, third rail 174 may include a population of notches. In certain embodiments, for example, the population of notches may include a left-hand notch 176 and a right-hand notch 178. While first and second rails 152a, 152b are illustrated with only two tabs and two notches and third rail 174 is illustrated with only two notches, it will be understood that a greater or lesser number of tabs and/or notches may be included in first and second rails 152a, 152b and/or third rail 174 without departing from the scope of the invention.

Accordingly, first left-hand tab 154a of first rail 152a may be adapted to be inserted into fourth left-hand slot 186a of top panel 12 and second right-hand tab 156a of first rail 152a may be adapted to be inserted into fourth right-hand slot 186b of top panel 12. First left-hand notch 158a of first rail 152a may be adapted to interlock with second left-hand notch 140a of left leg member 126a and second right-hand notch 160a of first rail 152a may be adapted to interlock with second right-hand notch 140b of right leg member 126b. Additionally, first left-hand tab 154b of second rail 152b may be adapted to be inserted into third left-hand slot 184a of top panel 12 and second right-hand tab 156b of second rail 152b may be adapted to be inserted into third right-hand slot 184b of top panel 12. First left-hand notch 158b of second rail 152b may be adapted to interlock with first left-hand notch 138a of left leg member 126a and second right-hand notch 160b of second rail 152b may be adapted to interlock with first right-hand notch 138b of right leg member 126b. In various embodiments, for example, where cross member assembly 150 includes third rail 174, left-hand notch 176 of third rail 174 may be adapted to interlock with slot 142a of rear left-hand leg 130a and a right-hand notch 178 of third rail 174 may be adapted to interlock with slot 142b of rear right-hand leg 130b.

As stated above, shelf member 162 and second rail 152b may be rotatably affixed to first rail 152a in a variety of ways, including, but not limited to, hinges 164. Accordingly, cross member assembly 150 may be adapted to be in two positions, a first position A (see FIG. 6D) and a second position B (see FIG. 6D). If article of furniture 10 is shipped and/or sold flat (i.e., "flat packed"), shelf member 162 and second rail 152b can both be in the first position A. When shelf member 162 is in the first position A, shelf member 162 is substantially co-planar with and parallel to first rail 152a and when second rail 152b is in the first position A, second rail 152b is substantially co-planar with and parallel to first rail 152a. Shelf member 162 and second rail 152b can then be rotated to the second position B for assembly of article of furniture 10. When shelf member 162 is in the second position B, shelf member 162 is substantially perpendicular to first rail 152a and when second rail 152b and shelf member 162 are in the second position B, second rail 152b is substantially perpendicular to shelf member 162 and substantially parallel to first rail 152a. Additionally, when shelf member 162 and second rail 152b are in the second position B, cross member assembly 150 may be substantially U-shaped. Because shelf member 162 and second rail 152b are rotatably affixed to first rail 152a, cross member assembly 150 can be easily moved from the flat packed first position A to the U-shaped second position B. This can be accomplished by one person without the need for additional tools or fasteners. The U-shape of the shelf cross member assembly may assist in providing structural support for the article of furniture 10. Furthermore, a shelf or gutter 166 can be formed when shelf member 162 and second rail 152b are in the second position B. As described above, shelf or gutter 166 may house a variety of objects including, but not limited to, wires 52, hard drives, surge protectors, etc.

The first and second positions A, B of cross member assembly 150 could alternatively be described as the first and second rails 152a, 152b moving relative to the shelf member 162. Accordingly first rail 152a and second rail 152b can both be in the first position A. When first rail 152a and second rail 152b are in the first position A, first rail 152a and second rail 152b are substantially co-planar with and parallel to shelf member 162. First rail 125a and second rail 152b can then be rotated to the second position B for assembly of article of furniture 10. When first rail 152a and second rail 152b are in the second position B, first rail 152a is substantially perpendicular to shelf member 362 and second rail 352b is substantially perpendicular to shelf member 362 and substantially parallel to first rail 352a.

Thus while cross member assembly 150 is described herein in relation to an article of furniture 10 which can be used as a desk or table, cross member assembly 150 can be used in any embodiment of an article of furniture 10. Accordingly, it will be understood that any article of furniture described herein can include a first support member, a second support member, and one or more cross member assemblies. One or more cross member assemblies 150 may include a shelf member 162, a first rail 152a and a second rail 152b. First and second rails 152a, 152b may be rotatably connected to shelf member 162 such that first and second rails 152a, 152b may be adapted to be in a first position and may be adapted to be rotated to a second position. Furthermore, first rail 152a may include a population of notches adapted to be interlocked with one or more of the first support member and the second support member when first rail 152a is in the second position and second rail 152b may include a population of notches adapted to be interlocked with one or more of the first support member and the second support member when second rail 152b is in the second position.

Referring again to FIG. 6B, in certain embodiments of article of furniture 10, first rail 152a may include a front passageway 168 and/or second rail 152b may include a rear passageway 170 which may permit access to shelf or gutter 166. Various embodiments of front and/or rear passageways 168, 170 may be partially closed by cord, wire, netting 194 or the like which may assist in holding a variety of objects including, but not limited to, wires 52, hard drives, surge protectors, etc. within shelf or gutter 166.

Figure 7:
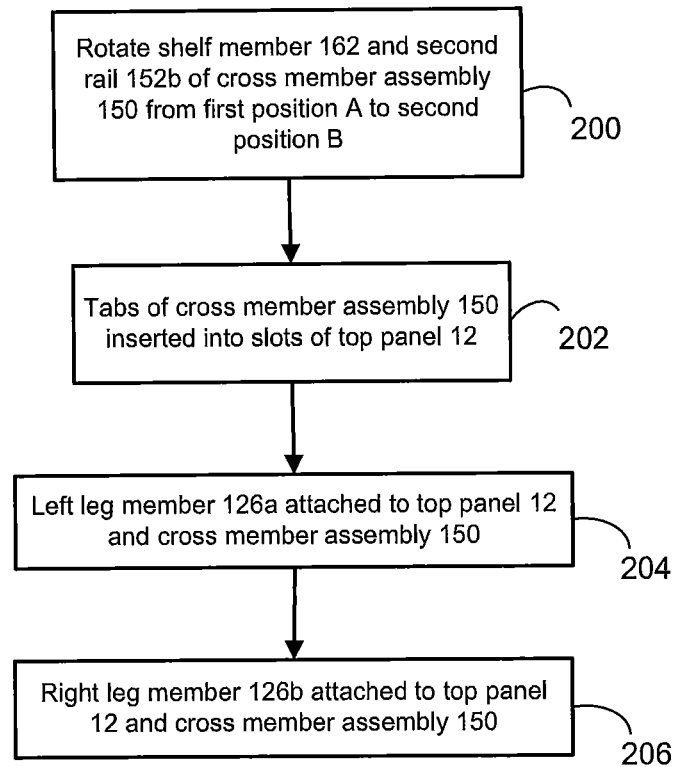
FIG. 7 is a flowchart illustrating a method of assembly of an article of furniture according to one embodiment of the invention.

As illustrated in FIG. 7, one method of assembling certain embodiments of article of furniture 10 is shown. Shelf member 162 and second rail 152b of cross member assembly 150 are first rotated from the first position A to the second position B at step 200 such that the cross member assembly 150 is in the second position B. Then at step 202, cross member assembly 150 is inserted into top panel 12. Accordingly, first left-hand tab 154a and second right-hand tab 156a of first rail 152a are inserted into fourth left-hand slot 186a and fourth right-hand slot 186b, respectively, of top panel 12. At the same time, first left-hand tab 154b and second right-hand tab 156b of second rail 152b are inserted into third left-hand slot 184a and third right-hand slot 184b, respectively, of top panel 12. Then at steps 204 and 206, left and right leg members 126a, 126b are attached to top panel 12 and cross member assembly 150.

At step 204, first left-hand tab 134a and second left-hand tab 136a of left leg member 126a are aligned with and inserted into first left-hand slot 180a and second left-hand slot 182a, respectively, of top panel 12. First left-hand notch 138a and second left-hand notch 140a of left leg member 126a are aligned and interlocked with first left-hand notch 158b of second rail 152b and first left-hand notch 158a of first rail 152a, respectively. Additionally, in certain embodiments wherein cross member assembly 150 includes a third rail 174, left-hand notch 176 of third rail 174 is aligned and interlocked with slot 142a of left leg member 126a.

Then at step 206, first right-hand tab 134b and second right-hand tab 136b of right leg member 126b are aligned with and inserted into first right-hand slot 180b and second right-hand slot 182b, respectively, of top panel 12. First right-hand notch 138b and second right-hand notch 140b of right leg member 126b are aligned and interlocked with first right-hand notch 160b of second rail 152b and first right-hand notch 160a of first rail 152a, respectively. Additionally, in certain embodiments wherein cross member assembly 150 includes a third rail 174, right-hand notch 178 of third rail 174 is aligned and interlocked with slot 142b of right leg member 126b. While steps are described herein in one order, it will be understood that other embodiments of the method can be carried out in any order without departing from the scope of the invention.

Figure 8:
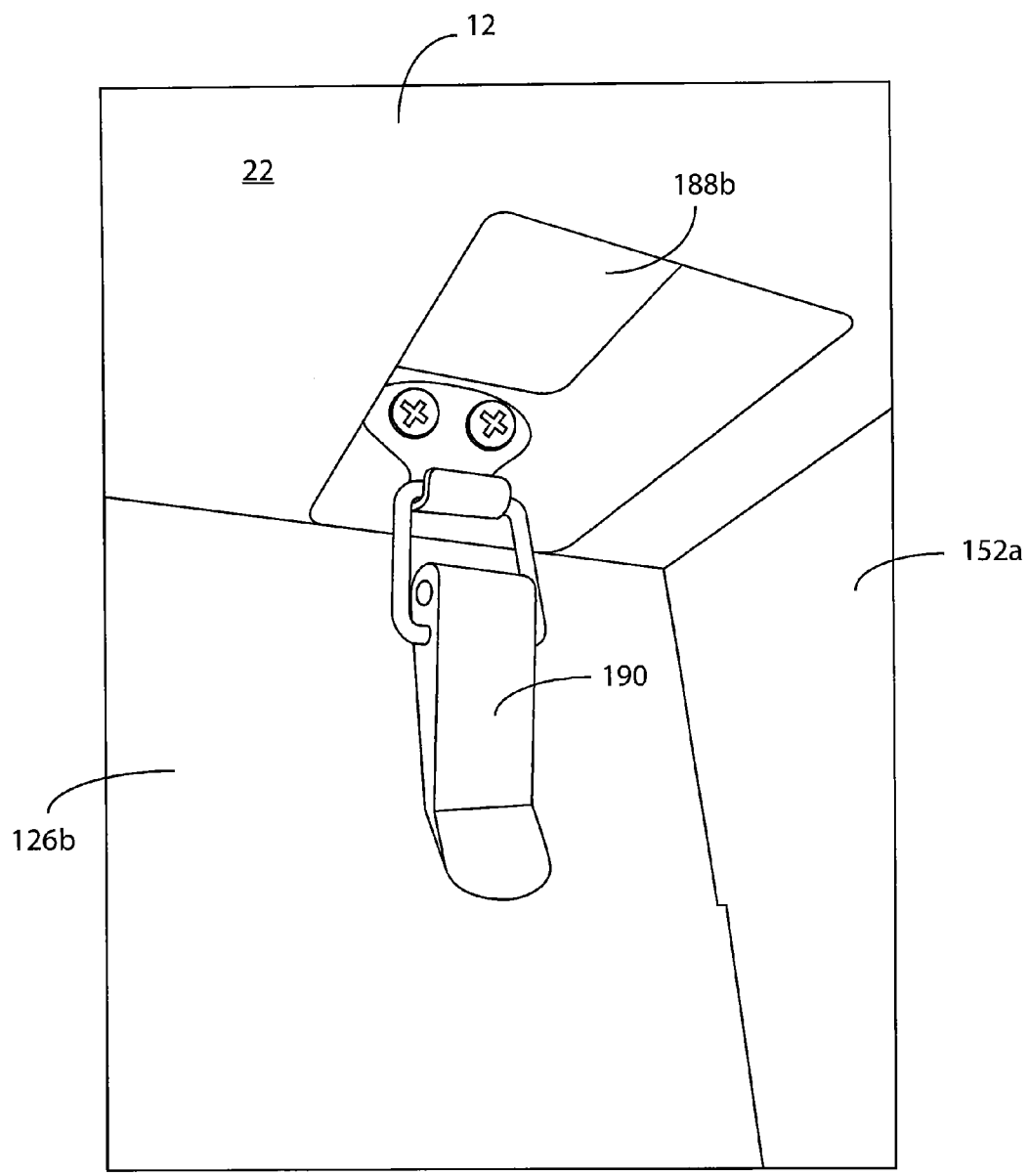
FIG. 8 is a bottom perspective view of a portion of an article of furniture according to one embodiment of the invention.

In various embodiments, as shown in FIGS. 6B and 8, bottom surface 22 of top panel 12 may include a left-hand recess 188a and a right-hand recess 188b wherein left- and right-hand recesses 188a, 188b may be blind, such that left- and right-hand recesses 188a, 188b do not extend all the way through to top surface 20 of top panel 12. Disposed within each of left- and right-hand recesses 188a, 188b may be a hook portion of a latch assembly 190. The remaining portion of each latch assembly 190 may be disposed on left leg member and right leg members 126a, 126b. After article of furniture 10 has been assembled each latch assembly 190 of left leg member and right leg members 126a, 126b may be latched to lock top panel 12, left leg assembly 126a, right leg assembly 126b and cross member assembly 150 together. Latch assembly 190 may be similar to a trunk latch; however it will be understood that any type and/or construction of latch assembly or other assembly for releasably affixing parts known in the art may be used to lock top panel 12, left leg assembly 126a, right leg assembly 126b and cross member assembly 150 together without departing from the scope of the invention. Additionally, in other embodiments, top panel 12 may not include recesses 188a, 188b and latch assembly 190 may be disposed on bottom surface 22 of top panel 12. Accordingly, various embodiments of article of furniture 10 described herein may be flat packed and may be easily assembled, disassembled and reassembled without any tools. In other embodiments, cross member assembly 150 may additionally or alternatively be latched to left leg member 126a and/or right leg member 126b via a latch assembly.

Referring now to FIGS. 11, 11A, 11B and 11C, another embodiment of article of furniture 310 is illustrated. In various embodiments, article of furniture 310 may be a shelf (e.g., a book shelf). Article of furniture 310 may include two or more shelf support members 326a, 326b and one or more shelf cross member assemblies 350. In certain embodiments, for example, article of furniture 310 may include a left shelf support member 326a, a right shelf support member 326b, and one or more shelf cross member assemblies 350 disposed between the left shelf support member 326a and the right shelf support member 326b. Left shelf support member 326a may include a population of slots 342a disposed at various vertical locations along left shelf support member 326a. Right shelf support member 326b may include a population of slots 342b disposed at various vertical locations along right shelf support member 326b.

Figure 11:
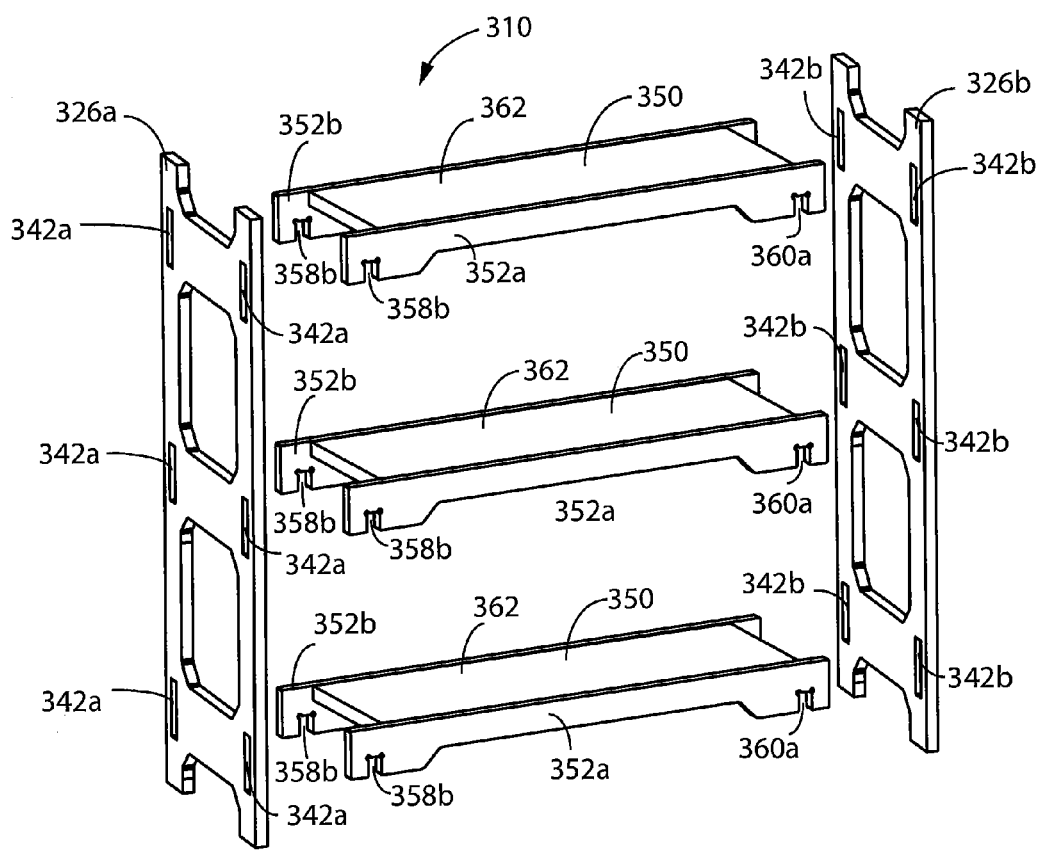
FIG. 11 is an left perspective exploded view of a left shelf support member, right shelf support member and shelf cross member assembly of an article of furniture according to one embodiment of the invention.
Figure 11B:
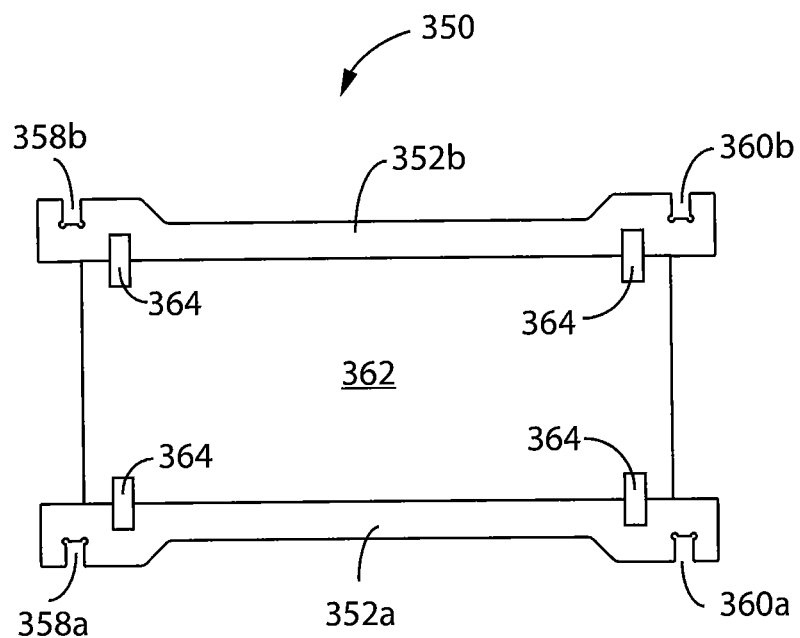
FIG. 11B is a top view of a cross member assembly of an article of furniture according to one embodiment of the invention.
Figure 11C:
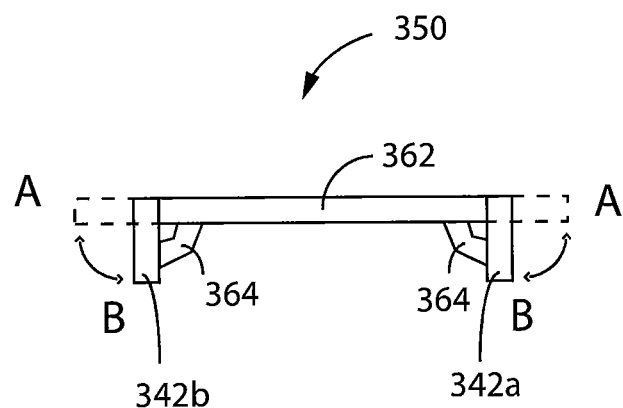
FIG. 11C is a left side view of a cross member assembly of an article of furniture according to one embodiment of the invention.

In certain embodiments of article of furniture 310 as shown in FIGS. 11, 11B and 11C, each of the one or more shelf cross member assemblies 350 may include a first rail 352a, a second rail 352b, and a shelf member 362. First rail 352a and second rail 352b may be rotatably affixed to shelf member 362 in a variety of ways including, but not limited to, hinges 364, fabric, plastic, rubber, etc. In various embodiments, first rail 352a may have a population of notches. In certain embodiments, for example, the population of notches may include a first left-hand notch 358a and a second right-hand notch 360a. Additionally, in various embodiments, second rail 352b may have a population of notches. In certain embodiments, for example, the population of notches may include a first left-hand notch 358b and a second right-hand notch 360b. First left-hand notch 358a of first rail 352a may be adapted to interlock with one or more of slots 342a of left shelf support member 326a and second right-hand notch 360a of first rail 352a may be adapted to interlock with one or more slots 342b of right shelf support member 326b. Additionally, first left-hand notch 358b of second rail 352b may be adapted to interlock with one or more slots 342a of left shelf support member 326a and second right-hand notch 360b of second rail 352b may be adapted to interlock with one or more slots 342b of right shelf support member 326b.

Figure 11A:
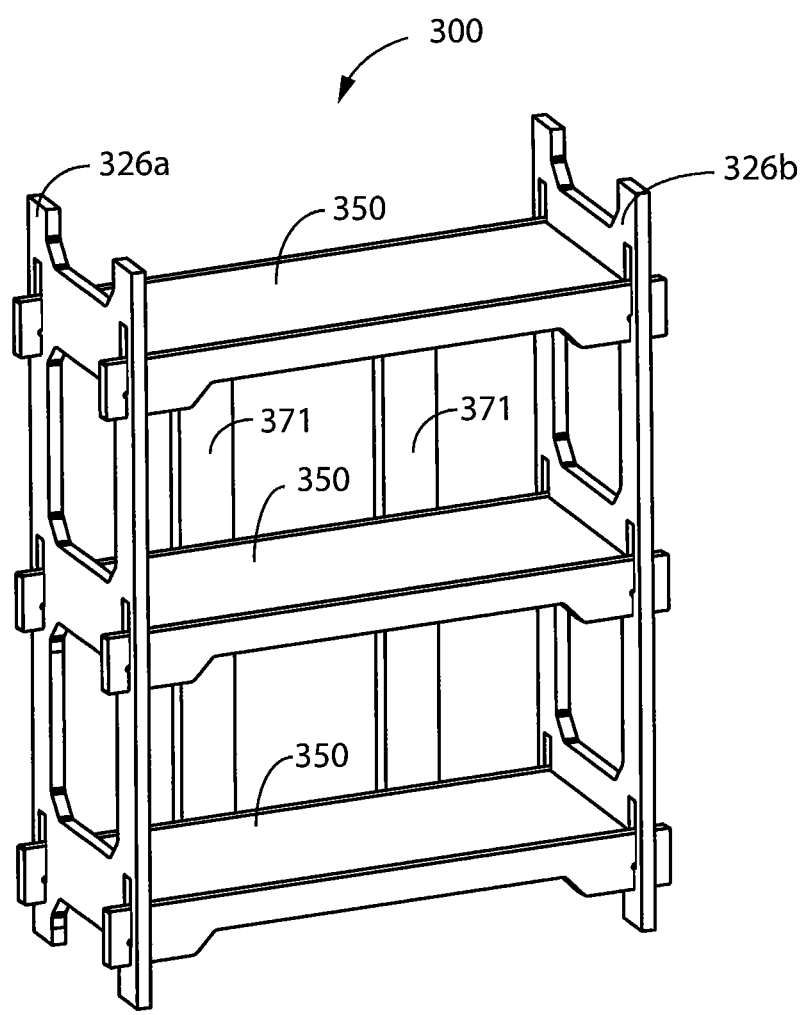
FIG. 11A is a left perspective view of an article of furniture according to one embodiment of the invention.

Article of furniture 310 may include any number of shelf cross members 350 interlocked with left and right shelf support members 326a, 326b without departing from the scope of the invention. While only one left shelf support member 326a and one right shelf support member 326b are illustrated, article of furniture 310 may include more than one of each of left and right shelf support members 326a, 326b. Additionally, in certain embodiments, for example, article of furniture 10 may include one or more shelf support members disposed between left and right shelf support members 326a, 326b. In yet other embodiments of article of furniture 310 as shown in FIG. 11A, one or more braces 371 may connect one or more of shelf support members 350. These additional shelf support members and/or braces may assist in providing additional structural support for article of furniture, when, for example, article of furniture is very wide or if a large amount of objects are to be placed on shelf cross member assemblies 350 of article of furniture.

As stated above, first rail 352a and second rail 352b may be rotatably affixed to shelf member 362 in a variety of ways, including, but not limited to, hinges 364. Accordingly, shelf cross member assembly 350 may be adapted to be in two positions, a first position A (see FIG. 11C) and a second position B (see FIG. 11C). If article of furniture 310 is shipped and/or sold flat (i.e., "flat packed"), first rail 352a and second rail 352b can both be in the first position A. When first rail 352a and second rail 352b are in the first position A, first rail 352a and second rail 352b are substantially co-planar with and parallel to shelf member 362. First rail 325a and second rail 352b can then be rotated to the second position B for assembly of article of furniture 310. When first rail 352a and second rail 352b are in the second position B, first rail 352a is substantially perpendicular to shelf member 362 and second rail 352b is substantially perpendicular to shelf member 362 and substantially parallel to first rail 352a. Additionally, when first rail 352a and second rail 352b are in the second position B, shelf cross member assembly 350 may be a substantially inverted U-shape. Because first rail 352a and second rail 352b are rotatably affixed to shelf member 362, shelf cross member assembly 350 can be easily moved from the flat packed first position A to the U-shaped second position B. This can be accomplished by one person without the need for additional tools or fasteners. The U-shape of the shelf cross member assembly may assist in providing structural support for the article of furniture 310. In various embodiments, shelf cross member assemblies 350 may further include a channel 30 as described more fully elsewhere herein.

Figure 12:
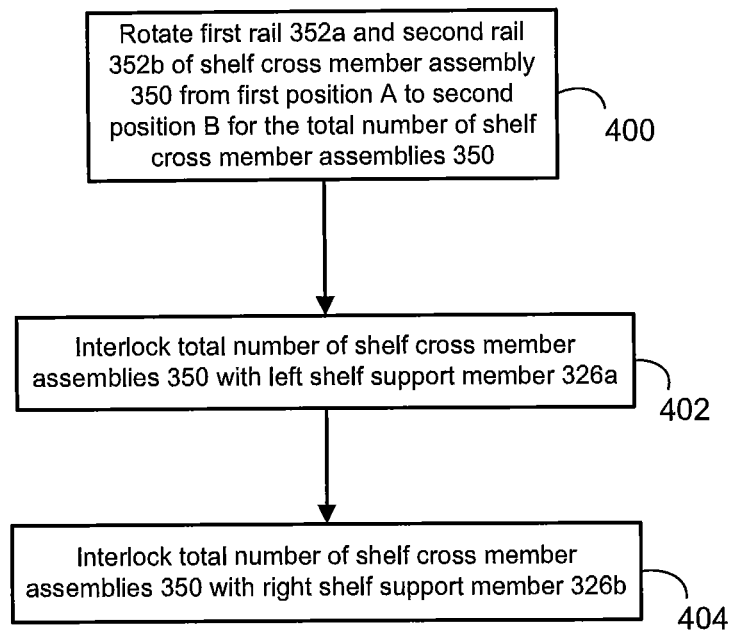
FIG. 12 is a flowchart illustrating a method of assembly of an article of furniture according to one embodiment of the invention.

As illustrated in FIG. 12, one method of assembling certain embodiments of article of furniture 310 is shown. For a total number of shelf cross member assemblies 350, each first rail 352a and second rail 352b are first rotated from the first position A to the second position B at step 400 such that each of the total number of shelf cross member assemblies 350 are in the second position B. Then at step 402, each of the total number of shelf cross member assemblies 350 are interlocked with left shelf support member 326a. Accordingly, the first left-hand notch 358a of first rail 352a and first left-hand notch 358b of second rail 352b of each of the total number of shelf cross member assemblies 350 are aligned and interlocked with one or more of the population of slots 342a of left shelf support member 326a. Then at step 404, each of the total number of shelf cross member assemblies 350 are interlocked with right shelf support member 326b. Accordingly, the first right-hand notch 360a of first rail 352a and first right-hand notch 360*b* of second rail 352*b* of each of the total number of shelf cross member assemblies 350 are aligned and interlocked with one or more of the population of slots 342*b* of right shelf support member 326*a*. While steps are described herein in one order, it will be understood that other embodiments of the method can be carried out in any order without departing from the scope of the invention.

Figure 9:
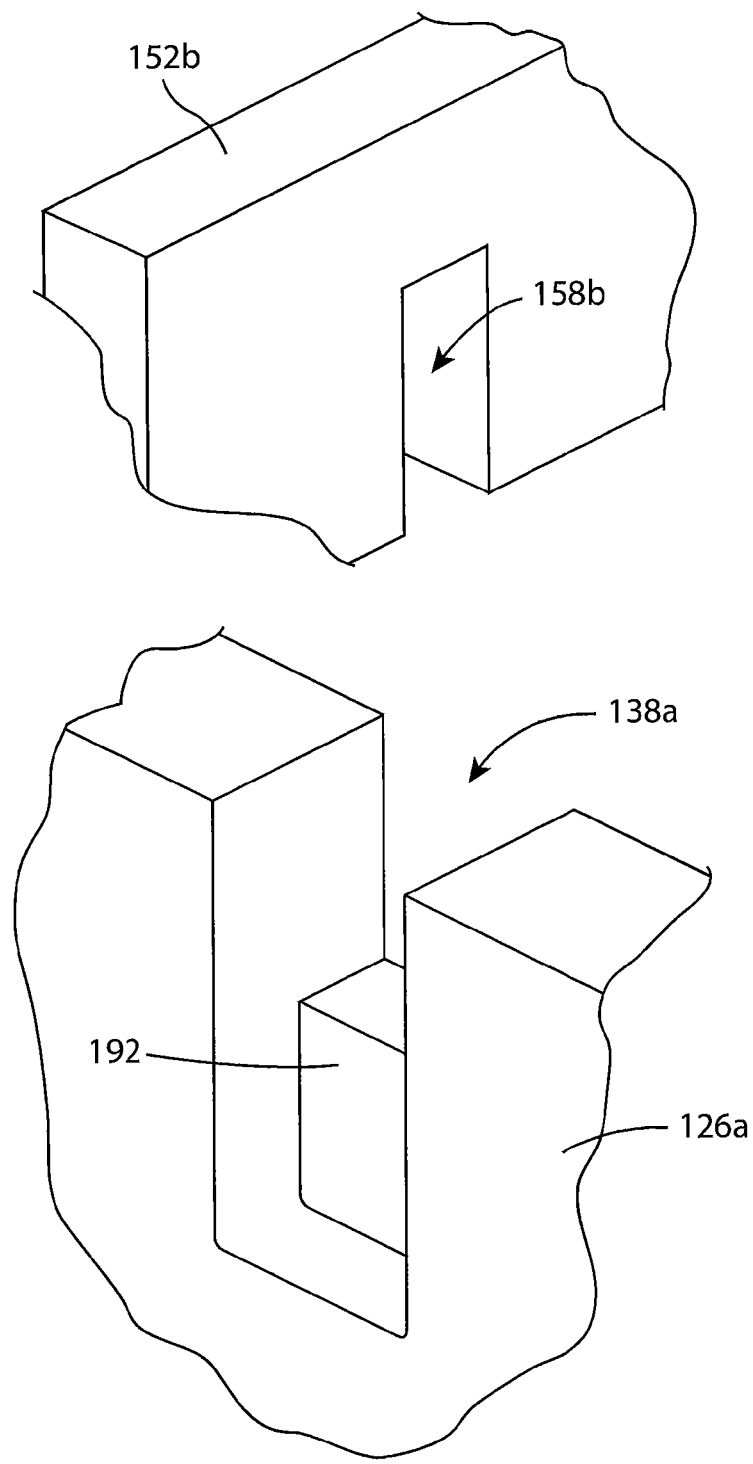
FIG. 9 is a left front perspective view of a portion of a left leg member and a second rail of an article of furniture according to one embodiment of the invention.
Figure 9A:
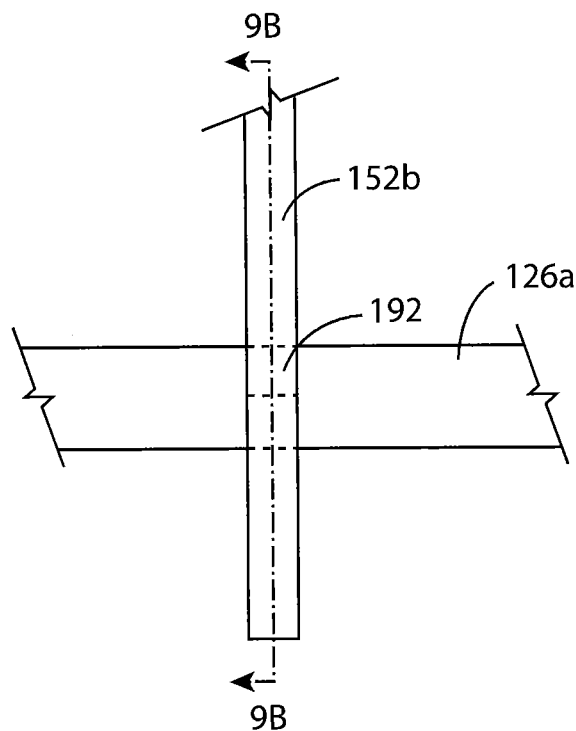
FIG. 9A is a top view of a portion of a left leg member and a second rail of an article of furniture according to one embodiment of the invention.
Figure 9B:
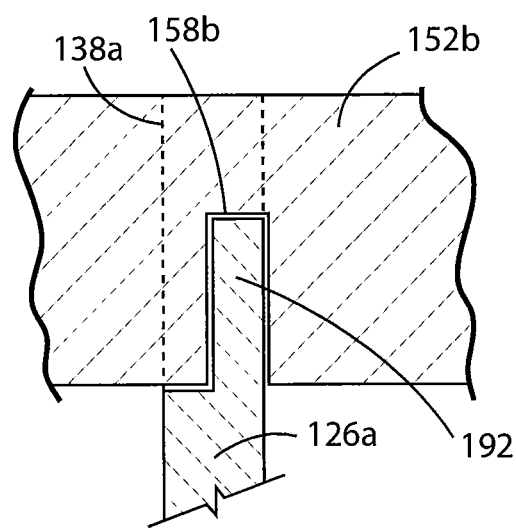
FIG. 9B is a right cross section view of a portion of a left leg member and a second rail of an article of furniture according to one embodiment of the invention.

Turning now to FIGS. 9, 9A and 9B, other embodiments of notches 138*a*, 138*b*, 140*a*, 140*b* and slots 142*a*, 142*b*, 342*a*, 342*b* are described in detail. In certain embodiments, notches 138*a*, 138*b*, 140*a*, 140*b* and slots 142*a*, 142*b*, 342*a*, 342*b* of left and right leg members 126*a*, 126*b* and/or left and right shelf support members 326*a*, 326*b* may have internal step 192. The internal step 192 may assist in increasing the structural strength of article of furniture 10. While only first left-hand notch 138*a* of left leg assembly 126*a* is illustrated in FIGS. 9, 9A and 9B, it will be understood that internal step 192 may be in any of notches 138*a*, 138*b*, 140*a*, 140*b* and slots 142*a*, 142*b*, 342*a*, 342*b*. Accordingly, as shown in FIGS. 9A and 9B, first left-hand notch 138*a* of left leg assembly 126*a* may be inserted into first left-hand notch 158*b* of second rail 152*b*, wherein first left-hand notch 158*b* is sized to accept internal step 192. A portion of second rail 152*b* proximate first left-hand notch 158*b* may thus reside in first left-hand notch 138*a* of left leg assembly 126*a* such that external surfaces of second rail 152*b* can contact the internal surfaces of first left-hand slot which, in combination with internal step 192, may assist in increasing the structural strength of article of furniture 10.

Figure 10:
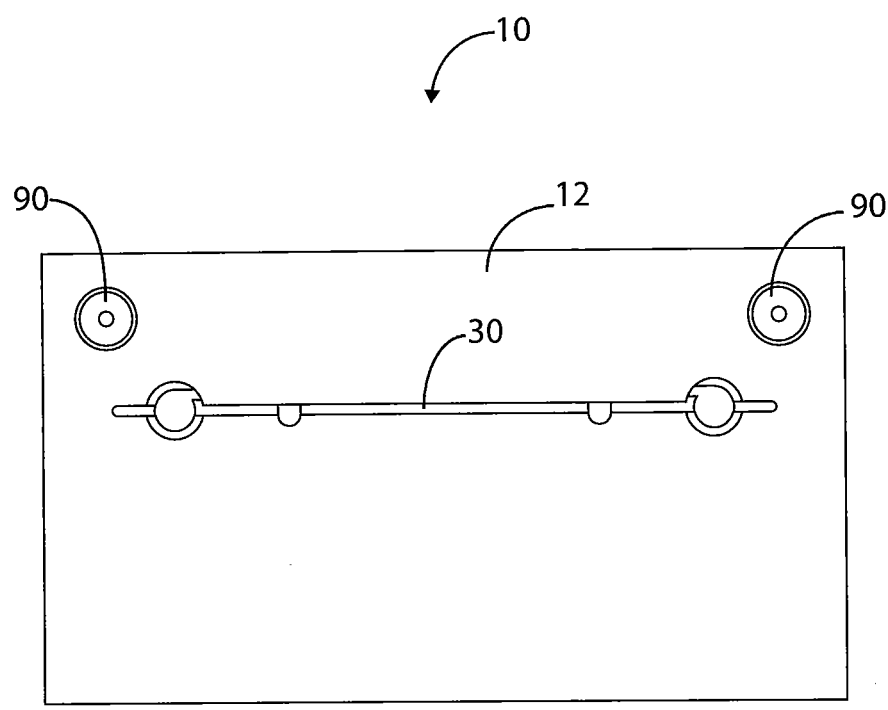
FIG. 10 is a top view of a top panel of an article of furniture having speakers according to one embodiment of the invention.

Any embodiment of article of furniture 10 as described herein may also include a variety of optional features. In certain embodiments, for example, as illustrated in FIG. 10, top panel 12 may include speakers 90 disposed in top panel. Speakers 90 may be connected to a variety of devices 50 including, but not limited to, an amplifier, a computer, an mp3 player, a telephone, a tablet, etc. In other embodiments, for example, article of furniture 10 may also include a subwoofer (not shown). The subwoofer may be affixed to top panel 12, shelf or gutter 166, supporting members 24, left leg member 126*a*, and/or right leg member 126*b*. In other embodiments, for example, as illustrated in FIG. 1, top panel 12 may include one or more magnetic members 92 disposed along front portion 15 of top panel 12, wherein the one or more magnetic members 92 may be attracted via a magnetic force. In certain embodiments, for example, magnetic members 92 may be formed of, but are not limited to, magnets or metallic materials. Magnetic members 92 may be used to temporarily retain earbuds, keys, and/or any metallic and/or magnetic object. In other embodiments, a headphone jack 96 may be disposed along front portion 12 of top panel 12. Accordingly, a wire (not shown) may run from headphone jack 96 through top panel 12 of article of furniture 10 to back portion 14 of top panel 12 where the user can connect to the wire a variety of devices 50. By including a headphone jack 96 along front portion 15 of top panel 12, a user can use headphones or earbuds without requiring the headphone or earbud wire to extend across top surface 20 of top panel 12, potentially interfering with the use of top panel 12. In yet other embodiments, for example, top panel 12 may include an inductive charging system (not shown) for wirelessly charging one or more devices 50 disposed in or on top panel 12 and/or inserted into channel 30. Any type of inductive charging system known in the art and/or hereinafter developed can be adapted to be used with the embodiments described herein without departing from the scope of the invention. In yet other embodiments, for example, one or more radio frequency identification (RFID), near field communication (NFC), and/ or Bluetooth® (as defined in IEEE Standard 801.15 and developed by the Bluetooth Special Interest Group) transmitters, receivers, transceivers, and/or tags (not shown) may be disposed in or on top panel 12 and may be used for a variety of purposes, including, but not limited to, transmitting and/or receiving data from a device 50, controlling a device 50 (e.g., unlocking device 50, locking device 50, installing and/or running an application and/or routine on device 50), conducting a monetary transaction, etc.

Thus, there has been shown and described a novel article of furniture, which overcome many of the problems of the prior art set forth above. It will be apparent, however, to those familiar in the art, that many changes, variations, modifications, and other uses and applications for the subject devices and methods are possible. All such changes, variations, modifications, and other uses and applications that do not depart from the spirit and scope of the invention are deemed to be covered by the invention which is limited only by the claims which follow.

The invention claimed is:

1. An article of furniture, comprising:
 i) a top panel having a bottom surface and a top surface; and
 ii) at least one channel disposed in the top panel, the channel comprising a top opening, a bottom opening, an upper front wall, a lower front wall, and an upper rear wall, wherein the top and bottom openings are connected such that the channel forms a passageway from the top surface to the bottom surface of the top panel, wherein the lower front wall is a first horizontal distance along a first direction from the upper front wall and the upper rear wall is a second horizontal distance along the first direction from the upper front wall, wherein the second horizontal distance is less than or equal to the first horizontal distance, and wherein the channel is adapted to receive a device in the top opening.

2. The article of furniture of claim 1 wherein the top panel further comprises a major axis and wherein the channel extends a length parallel to the top surface of the top panel and wherein the length of the channel is at an angle Θ with respect to the major axis of the top panel, wherein the angle Θ is from about 0° and about 90°.

3. The article of furniture of claim 1 further comprising one or more holes disposed in the channel.

4. The article of furniture of claim 1 further comprising one or more recesses disposed around the channel.

5. The article of furniture of claim 1 wherein a portion or all of the top surface of the top panel comprises a dry erase surface and/or a chalkboard surface.

6. The article of furniture of claim 1 wherein the top panel further comprises a front portion and one or more magnetic members are disposed in the front portion of top panel.

7. The article of furniture of claim 1 wherein the article of furniture is at least one of a desk, a table, a media console, and a night stand.

8. An article of furniture comprising:
 i) a first support member comprising a population of notches;
 ii) a second support member comprising a population of notches; and
 iii) one or more cross member assemblies comprising a shelf member, a first rail and a second rail, wherein the first rail and the second rail are hingedly connected to the shelf member such that the first and second rails are adapted to be in a first position wherein the first and second rails are substantially parallel to the shelf member and are adapted to be rotated by the hinged connection to a second position wherein the first and second rails are substantially perpendicular to the shelf member, and wherein the first rail comprises a population of notches adapted to be interlocked with one or more of the population of notches in the first and second support members when the first rail is in the second position and the second rail comprises a population of notches adapted to be interlocked with one or more of the population of notches in the first and second support members when the second rail is in the second position.

9. An article of furniture comprising:
  i) a top panel comprising a left-hand portion, a right-hand portion, a bottom surface, a top surface, and a population of slots disposed on the bottom surface;
  ii) a left leg member comprising a top portion, one or more legs extending a direction from the top portion, a population of tabs extending from the top portion opposite the direction of the one or more legs, and a population of notches disposed in the top portion, wherein the population of tabs are adapted to be inserted into one or more of the population of slots of the top panel;
  iii) a right leg member comprising a top portion, one or more legs extending a direction from the top portion, a population of tabs extending from the top portion opposite the direction of the one or more legs, and a population of notches disposed in the top portion, wherein the population of tabs are adapted to be inserted into one or more of the population slots of the top panel; and
  iv) a cross member assembly comprising:
    a) a first rail having a population of tabs adapted to be inserted into one or more of the population of slots of the top panel and a population of notches adapted to interlock with one or more of the population of notches of one or more of the left leg member and the right leg member;
    b) a second rail having a population of tabs adapted to be inserted into one or more of the population of slots of the top panel and a population of notches adapted to interlock with one or more of the population of notches of one or more of the left leg member and the right leg member; and
    c) a shelf member hingedly affixed to the first rail and wherein the second rail is hingedly affixed to the shelf member.

10. The article of furniture of claim 9, wherein the one or more legs of the left leg member further comprises a population of slots, the one or more legs of the right leg member further comprises a population of slots, the cross member assembly further comprises a third rail connected to the first rail by one or more braces, and the third rail comprises a population of notches adapted to interlock with one or more of the population of slots of one or more of the left leg member and the right leg member.

11. The article of furniture of claim 10, wherein the population of notches of the third rail comprises a left-hand notch and a right-hand notch, wherein the left-hand notch is adapted to interlock with one or more of the population of slots of the left leg member and the right-hand notch is adapted to interlock with one or more of the population of slots of the right leg member.

12. The article of furniture of claim 9 wherein:
  i) the population of slots in the top panel comprises:
    a) a first left-hand slot, a second left-hand slot, a third left-hand slot, and a fourth left-hand slot, wherein the first, second, third and fourth left-hand slots are disposed proximate the left-hand portion of the top panel and wherein the third and fourth left-hand slots are disposed at an angle with respect to the first and second left-hand slots; and
    b) a first right-hand slot, a second right-hand slot, a third right-hand slot, and a fourth right-hand slot, wherein the first, second, third and fourth right-hand slots are disposed proximate the right-hand portion of the top panel and wherein the third and fourth right-hand slots are disposed at an angle with respect to the first and second right-hand slots;
  ii) the population of tabs extending from the top portion of the left leg member comprises a first left-hand tab and a second left-hand tab adapted to be inserted into the first left-hand slot and the second left-hand slot, respectively, of the top panel, and wherein the population of notches disposed in the top portion of the left leg member comprises a first left-hand notch and a second left-hand notch;
  iii) the population of tabs extending from the top portion of the right leg member comprises a first right-hand tab and a second right-hand tab adapted to be inserted into the first right-hand slot and the second right-hand slot, respectively, of the top panel, and wherein the population of notches disposed in the top portion of the right leg member comprises a first right-hand notch and a second right-hand notch;
  iv) the population of tabs of the first rail comprises a first left-hand tab and a second right-hand tab, wherein the first left-hand tap is adapted to be inserted into the fourth left-hand slot of the top panel and the second right-hand tab is adapted to be inserted into the fourth right-hand slot of the top panel, and the population of notches of the first rail comprises a first left-hand notch and a second right-hand notch, wherein the first-left hand notch is adapted to interlock with the second left-hand notch of the left leg member and the second right-hand notch is adapted to interlock with the second right-hand notch of the right leg member; and
  v) the population of tabs of the second rail comprises a first left-hand tab and a second right-hand tab, wherein the first left-hand tab is adapted to be inserted into the third left-hand slot of the top panel and the second right-hand tab is adapted to be inserted into the third right-hand slot of the top panel, and the population of notches of the second rail comprises a first left-hand notch and a second right-hand notch, wherein the first left-hand notch is adapted to interlock with the first left-hand notch of the left leg member and the second right-hand notch is adapted to interlock with the first right-hand notch of the right leg member.

13. The article of furniture of claim 9 wherein the population of legs of the left leg member comprises a front left-hand leg and a rear left-hand leg and wherein the population of legs of the right leg member comprises a front right-hand leg and a rear right hand-leg.

14. The article of furniture of claim 9 wherein:
  i) the shelf member is adapted to be in a first position and a second position, wherein in the first position, the shelf member is substantially co-planar with first rail and wherein in the second position, the shelf member is substantially perpendicular to first rail; and
  ii) the second rail is adapted to be in a first position and a second position, wherein in the first position, the second rail is substantially co-planar with first rail and wherein in the second position, the second rail is substantially perpendicular to the shelf member and substantially parallel to the first rail.

15. The article of furniture of claim 14 wherein a shelf is formed when the shelf member and the second rail are both in the second position.

16. The article of furniture of claim 9 further comprising at least one channel disposed in the top panel, the channel comprising a top opening wherein the channel is adapted to receive a device in the top opening.

17. The article of furniture of claim 16 wherein the at least one channel further comprises a bottom opening, an upper front wall, a lower front wall, and an upper rear wall, wherein the top and bottom openings are connected such that the channel forms a passageway from the top surface to the bottom surface of the top panel and wherein the lower front wall is a first horizontal distance along a first direction from the upper front wall and the upper rear wall is a second horizontal distance along the first direction from the upper front wall, wherein the second horizontal distance is less than or equal to the first horizontal distance.

18. The article of furniture of claim 16 further comprising one or more holes disposed in the channel.

19. The article of furniture of claim 16 further comprising one or more recesses disposed around the channel.

20. The article of furniture of claim 9 wherein a portion or all of the top surface of the top panel comprises a dry erase surface and/or a chalkboard surface.

21. The article of furniture of claim 9 wherein the top panel further comprises a front portion and one or more magnetic members are disposed in the front portion of top panel.

22. The article of furniture of claim 9 wherein the article of furniture is at least one of a desk, a table, a media console, and a night stand.

* * * * *